US012649151B2

(12) United States Patent
Grigoryan et al.

(10) Patent No.: US 12,649,151 B2
(45) Date of Patent: Jun. 9, 2026

(54) MANIFOLDS, SYSTEMS AND METHODS FOR CONDUCTING BIOLOGICAL STUDIES UNDER FLOW

(71) Applicant: 3D SYSTEMS, INC., Rock Hill, SC (US)

(72) Inventors: Bagrat Grigoryan, Houston, TX (US); Jordan Miller, Houston, TX (US); Selene Alikah, Houston, TX (US); Matthew Gelber, Houston, TX (US); Faraz Jivan, Houston, TX (US); Andres Ruiz, Houston, TX (US); Jacob Snook, Houston, TX (US)

(73) Assignee: 3D Systems, Inc., Rock Hill, SC (US)

( * ) Notice: Subject to any disclaimer, the term of this patent is extended or adjusted under 35 U.S.C. 154(b) by 854 days.

(21) Appl. No.: 17/933,592

(22) Filed: Sep. 20, 2022

(65) Prior Publication Data

US 2023/0095466 A1 Mar. 30, 2023

Related U.S. Application Data

(60) Provisional application No. 63/248,404, filed on Sep. 24, 2021.

(51) Int. Cl.
*B01L 3/00* (2006.01)

(52) U.S. Cl.
CPC ..... *B01L 3/502715* (2013.01); *B01L 3/50273* (2013.01); *B01L 2200/027* (2013.01);
(Continued)

(58) Field of Classification Search
CPC ......... B01L 2200/026; B01L 2200/027; B01L 2200/10; B01L 2300/0681;
(Continued)

(56) References Cited

U.S. PATENT DOCUMENTS

| | | | | |
|---|---|---|---|---|
| 5,707,869 | A * | 1/1998 | Wolf | C12M 23/24 435/297.5 |
| 10,392,595 | B2 | 8/2019 | Golway et al. | |

(Continued)

FOREIGN PATENT DOCUMENTS

| | | |
|---|---|---|
| WO | WO 2014/102527 | 7/2014 |

OTHER PUBLICATIONS

International Search Report and Written Opinion for International Application No. PCT/US2021/030668, mailed Sep. 6, 2021.

(Continued)

*Primary Examiner* — Dean Kwak
(74) *Attorney, Agent, or Firm* — Maynard Nexsen PC; John P. Zimmer

(57) ABSTRACT

Some embodiments of the disclosure disclose manifolds, microfluidic systems and methods that provide control over fluid flow distribution to an array of bio-scaffolds contained within the manifolds. In some embodiments, multiple perfusates may be injected into the manifold via multiple inlets where the manifold contains a bio-assembly with a substrate having a bio-scaffold disposed thereon. Biological investigations of the perfusates may then be conducted in the vascular components and chambers of the bio-scaffold.

28 Claims, 13 Drawing Sheets

(52) U.S. Cl.
CPC ... *B01L 2200/10* (2013.01); *B01L 2300/0816* (2013.01); *B01L 2300/0867* (2013.01)

(58) Field of Classification Search
CPC ..... B01L 2300/0816; B01L 2300/0832; B01L 2300/0867; B01L 3/502; B01L 3/502715; B01L 3/50273; B01L 2300/027; C12M 23/16; C12M 23/40; C12M 21/08; C12M 23/20; C12M 23/22; C12M 25/14; C12M 29/04; C12M 29/10; C12M 33/14; C12M 41/36
See application file for complete search history.

(56) References Cited

U.S. PATENT DOCUMENTS

| | | | | |
|---|---|---|---|---|
| 2004/0115721 | A1* | 6/2004 | Mao | G01N 33/5306 435/7.5 |
| 2004/0256329 | A1* | 12/2004 | Meserol | A61M 1/3681 210/205 |
| 2009/0203126 | A1* | 8/2009 | Hung | B01L 3/502761 435/325 |
| 2010/0279268 | A1 | 11/2010 | Neumann et al. | |
| 2011/0229961 | A1* | 9/2011 | Higashi | C12M 23/16 435/287.1 |
| 2014/0030752 | A1* | 1/2014 | Cuiffi | C12M 23/12 435/375 |
| 2016/0032230 | A1* | 2/2016 | Deutsch | B29C 65/002 264/129 |
| 2017/0058243 | A1* | 3/2017 | Levner | C12M 29/10 |
| 2018/0052151 | A1 | 2/2018 | Nikkhah et al. | |
| 2018/0066220 | A1 | 3/2018 | Nath et al. | |
| 2019/0330583 | A1* | 10/2019 | Golway | C12M 29/10 |
| 2022/0025309 | A1 | 1/2022 | Atic et al. | |

OTHER PUBLICATIONS

Kinstlinger et al., "Perfusion and endothelialization of engineered tissues with patterned vascular networks," published online May 24, 2021, pp. 1-25, Nature Protocols I www.nature.com/nprot.

Staicu et al., "Lab-on-a-Chip Platforms as Tools for Drug Screening in Neuropathologies Associated with Blood-Brain Barrier Alterations," Jun. 21, 2021, pp. 1-23, Biomolecules, 2021, 11, 916. https://doi.org/10.3390/biom 11060916.

Schimek et al., Human multi-organ chip co-culture of bronchial lung culture and liver spheroids for substance exposure studies, May 12, 2020, 13 pgs, Scientific Reports—https://doi.org/10.1038/s4 I 98-020-642 I 9-6.

Wang et al., Engineering anastomosis between living capillary networks and endothelial cell-lined microfluidic channels, Nov. 18, 2015, 9 pgs, The Royal Society of Chemistry.

Ronaldson-Bouchard et al., "Organs-on-a-Chip: A Fast Track for Engineered Human Tissues in Drug Development," pp. 310-324, Mar. 1, 2018, Cell Stem Cell 22.

Zhang et al., "Organ-on-a-chip devices advance to market," 26 pgs, Jun. 7, 2017, The Royal Society of Chemistry.

Grigoryan et al., "Multivascular net\ vorks and functional imravascular topologies vlithin biocornpatible hydrogels," pp. 458-464 DOI, 10.1126/science.aav9750, Science, May 3, 2019:vol. 364, Issue 6439.

https://www.utwente.nl/en/mesaplus/research/centres-of-expertise/oocct/news/2021/3/991138/organ-on-chip-project-receives-huge-grant-to-make-the-leap-from-lab-to-fab.

Office Action issued in corresponding U.S. Appl. No. 17/307,880 dated Nov. 17, 2023.

International Search Report and Written Opinion issued in corresponding PCT Application No. PCT/IB2022/58885, mailed Feb. 2, 2023.

* cited by examiner

MANIFOLDS, SYSTEMS AND METHODS FOR CONDUCTING BIOLOGICAL STUDIES UNDER FLOW

CROSS-REFERENCE TO RELATED APPLICATIONS

This application claims priority to and the benefit of U.S. Provisional Application No. 62/248,404, filed Sep. 24, 2021, the contents of which are incorporated herein in its entirety.

FIELD OF THE DISCLOSURE

The present specification generally relates to manifolds, microfluidic systems and methods for conducting biological studies under flow, and more specifically, to manifolds, microfluidic systems and methods that provide control over fluid flow distribution to an array of bio-scaffolds contained within the manifolds.

BACKGROUND

Pre-clinical research and drug development generally relies on testing the behavior of human cells in a flat petri dish and in animal models of human disease to understand the physiology and predict the performance of drugs in the human body. The research environment, however, may not adequately represent the complex networked interactions actually taking place in the human body. For example, the cellular environment on plastic plates typically fails to accurately reflect the true cellular microenvironment. Further, the process of testing different drug concentrations to identify optimal ones can become cumbersome. Therefore, improved tools and platforms that accurately reflect a more accurate cellular microenvironment and allow for more efficient testing processes, such as during investigations to characterize the efficacy of multiple drug dosages, are needed.

SUMMARY

Some embodiments of the present disclosure disclose a manifold comprising a plate having one or more partitions, a first partition of the one or more partitions including a first recess shaped and sized to receive a first bio-assembly having a first bio-assembly inlet, a first bio-assembly outlet and a first bio-scaffold that is disposed on a substrate. In some instances, a bio-scaffold inlet of the first bio-scaffold is in fluid communication with the first bio-assembly inlet and a bio-scaffold outlet of the first bio-scaffold is in fluid communication with the first bio-assembly outlet. In some instances, the first partition further comprises an adhesive interface positioned within the first partition to interface with, and apply an adhesive to, the substrate of the first bio-assembly when the first bio-assembly is positioned in the first partition to attach the substrate of the first bio-assembly to the first partition. In addition, the manifold comprises a manifold inlet and a manifold outlet that are in fluid communication with the first bio-assembly inlet and the first bio-assembly outlet, respectively, when the first bio-assembly is positioned in the first partition.

Some embodiments of the present disclosure disclose a method, comprising: injecting a first fluid into a common fluid channel of a manifold via a first manifold inlet of the manifold; and injecting a second fluid into the common fluid channel via a second manifold inlet of the manifold. In some instances, the manifold includes a first partition having a first recess shaped and sized to receive a first bio-assembly having a first bio-assembly inlet, a first bio-assembly outlet and a first bio-scaffold disposed on a substrate; and the common fluid channel is in fluid communication with the first bio-assembly inlet and is configured to guide a first mixture of the first fluid and the second fluid to the first bio-assembly inlet.

Some embodiments of the present disclosure disclose a method for generating a manifold, the method comprising: producing, using an additive manufacturing technique, a plate having one or more partitions, a first partition of the one or more partitions including a first recess shaped and sized to receive a first bio-assembly having a first bio-assembly inlet, a first bio-assembly outlet and a first bio-scaffold. Further, the method comprises chemically functionalizing a substrate with a first heterobifunctional chemical crosslinker to affix the substrate to the first bio-scaffold produced thereon via the additive manufacturing technique that includes polymerizing a first hydrogel precursor in contact with the first heterobifunctional chemical crosslinker. In addition, the method comprises providing an adhesive to an adhesive interface positioned within the first partition to interface with, and apply the adhesive to, the substrate when the first bio-assembly is positioned in the first partition to attach the substrate to the first partition. The method also comprises producing, using the additive manufacturing technique, a manifold inlet and a manifold outlet that are in fluid communication with the first bio-assembly inlet and the first bio-assembly outlet, respectively, when the first bio-assembly is positioned in the first partition.

Some embodiments of the present disclosure disclose a bio-assembly, comprising: a lid; a barrier configured to adhere to the lid when in contact with the lid; a housing including a bio-assembly inlet and a bio-assembly outlet; a gasket configured to be positioned in between the barrier and the housing and provide at least substantially airtight seal when the barrier or the lid is affixed to the housing; a substrate configured to adhere to the housing when in contact with the housing; and a bio-scaffold produced using an additive manufacturing technique on a polymerized hydrogel precursor positioned on the substrate, the bio-scaffold affixed to the substrate via a chemical functionalization of the substrate with a heterobifunctional chemical crosslinker in contact with the hydrogel precursor.

Some embodiments of the present disclosure disclose a system, comprising: a manifold including: a plate having one or more partitions, a partition of the one or more partitions including a recess shaped and sized to receive the bio-assembly; and a manifold inlet and a manifold outlet. The system further comprises a bio-assembly positioned in the partition and having a bio-assembly inlet, a bio-assembly outlet and a bio-scaffold that is disposed on a substrate, the bio-assembly inlet and the bio-assembly outlet in fluid communication with the manifold inlet and the manifold outlet. In addition, the system comprises an inlet reservoir in fluid communication with the manifold inlet and configured to store a fluid to be fed into the manifold via the manifold inlet. The system also comprises a fluid pump configured to pump the fluid from the inlet reservoir into the manifold via the manifold inlet. Further, the system comprises an outlet reservoir in fluid communication with the manifold outlet and configured to receive and store fluid released by the manifold via the manifold outlet.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
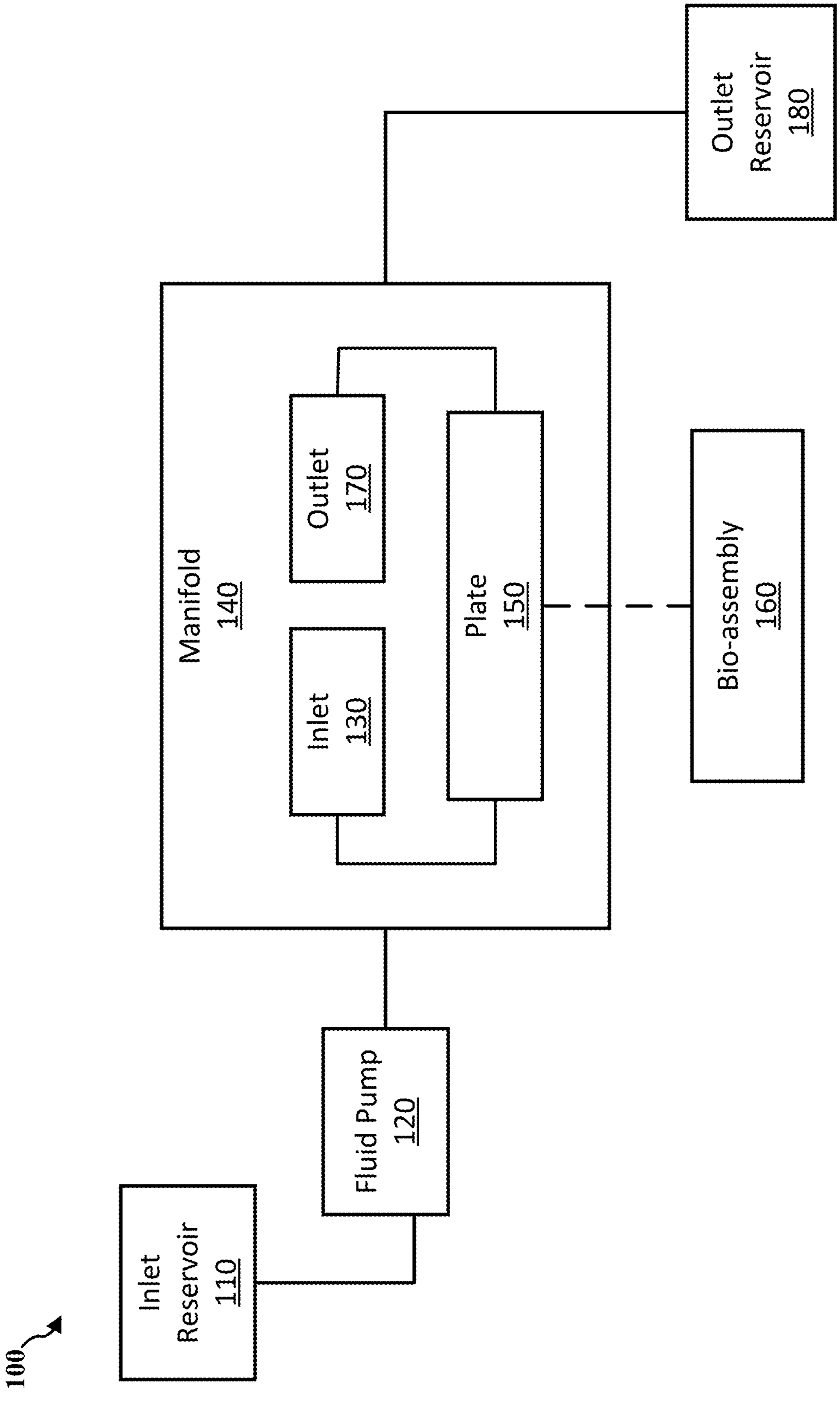
FIG. 1 is a schematic diagram of an example microfluidic system for conducting biological studies under flow, according to various embodiments.

Small animal models such as mice have been used to evaluate the safety and efficacy of drugs for various diseases that afflict humans. Such models, however, may not be ideal for developing human therapies because mice do not fully represent human anatomy or physiology. For example, compounds that have been shown to be effective in mice have failed during human clinical trials. There have also been reports of significant variability between test results from different small animal models. Such issues may be addressed at least in part with the use of bioactive scaffolds (i.e., bio-scaffolds) that contain features that mimic human/animal anatomy and physiology, resulting in biomimetic tissue models that provide more germane data for use in investigating the safety and efficacy of drug candidates for human treatments.

In some cases, it may be desirable to conduct biological studies, such as investigations of drug candidates, using multiple bio-scaffolds in a single setting, i.e., using a single microfluidic system (e.g., manifold) that includes or contains the multiple bio-scaffolds. Such an arrangement may allow an investigator to control the various parameters of the biological studies and highly improve the efficiency thereof. For example, to investigate the effects of various doses of a candidate drug in a drug safety and efficacy study, an investigator may wish to direct, in a controlled manner, fluids containing different doses of the candidate drug to the different bio-scaffolds contained within the same microfluidic system or manifold. Further, in doing so, to avoid leaks and complications that are inherent in such biological studies, one may wish for the manifold to have a limited number of connections connecting the manifold to external systems (i.e., limited number of "world-to-plate" connections).

The present disclosure discloses embodiments of bio-scaffolds, bio-assemblies containing the bio-scaffolds and manifolds configured to receive and contain the bio-assemblies, for conducting biological studies under flow. In particular, embodiments of manifolds, microfluidic systems and methods that provide control over fluid flow distribution to multiple bio-assemblies contained within the manifold and multiple bio-scaffolds contained within the multiple bio-assemblies are disclosed. That is, the manifolds may have fluidic arrangements including one or more manifold inlets, one or more manifold outlets, and fluidic channels extending therebetween allowing fluid from an inlet reservoir to reach the bio-assemblies and the bio-scaffolds prior to being discharged to an outlet reservoir via the one or more manifold outlets. For the fluid to reach the bio-scaffolds and ultimately exit the manifold, the one or more manifold inlets and the one or more manifold outlets may be in fluidic communication with the inlets of the bio-assemblies and the outlets of the bio-assemblies, respectively, which in turn are in respective fluidic communication with the inlets of the bio-scaffolds and the outlets of the bio-scaffolds. The various embodiments, configurations, and implementations of the technologies, platforms, and methods for conducting biological studies under flow are described in further detail with respect to FIGS. 1-13.

FIG. 1 shows a schematic diagram of an example microfluidic system 100 for conducting biological studies under flow, according to various embodiments. In some embodiments, a microfluidic system 100 for conducting biological studies under flow includes an inlet reservoir 110, a manifold 140, and an outlet reservoir 180. In some instances, the microfluidic system 100 may also include a fluid pump 120. The manifold 140 may in turn include a plate 150 having one or more partitions configured for receiving or containing one or more bio-assemblies 160 that contain, among other things, a bio-active scaffold (i.e., a bio-scaffold). The manifold 140 may also include a manifold inlet 130 that is in fluidic communication with the inlet reservoir 110 and configured to receive fluids from the inlet reservoir 110 (e.g., fluids fed by the fluid pump 120) and a fluidic arrangement such as a network of fluid channels that transport the received fluid throughout the manifold 140 (e.g., to the bio-assemblies 160 contained therein). In some cases, the manifold 140 includes a manifold outlet 170 that is in fluidic communication with the outlet reservoir 180 and is configured to receive fluids exiting the bio-assemblies 160 and discharge the same to the outlet reservoir 180.

In some embodiments, the inlet reservoir 110 may be or include one or more reservoirs configured to store fluids to be directed or injected into the manifold 140 (e.g., alternatively referred herein as "perfusable media" or "perfusate"). In some instances, such fluids can be gases, liquids, etc., that may be part of a biological study that is being conducted with the use of the microfluidic system 100, examples of which include but are not limited to drugs, cell culture media, bioactive factors, etc. For instance, the drugs can be or include chemotherapeutic drugs that are in fluid form, antibiotics (e.g., doxycycline), etc. Further, the cell culture media can be or include one or more of glucose solutions, serums, antibiotics, amino acids, inorganic salts, vitamins, etc. In some instances, the bioactive factors can be or include growth factors, intracellular signaling molecules (e.g., receptors, kinases, transcription factors, etc.), signaling mimetics derived from synthetic or natural compounds, etc.

In some cases, the inlet reservoir 110 can be two (e.g., or more) inlet reservoirs and one of the reservoirs may store a first fluid and another of the reservoir may store a second fluid, where the microfluidic system 100 may be used to investigate the effect of the first fluid on the second fluid, or vice versa. For instance, the investigation may be to determine the safety and efficacy of a candidate chemotherapeutic drug to treat some type of cancer, and the first fluid and the second fluid can be the chemotherapeutic drug and one or more of the afore-mentioned cell culture media, respectively. In such cases, the first fluid and the second fluid may both be directed towards the manifold where the fluids may mix, as discussed below with reference to FIGS. 11 and 12. As another example, the first fluid can be a bioactive inhibitor/agnostic and the second fluid can be a solution that is being screened for bioactivity.

In some embodiments, the fluid pump 120 of the microfluidic system 100 can be syringe pump, peristaltic pump, pneumatic pump, gravity driven flow pump, etc., that is configured to pump the perfusable media stored in the inlet reservoir 110 to direct the perfusable media to one or more manifold inlets 130 of the manifold 140. In some instances, the fluid pump 120 may be configured to pump the fluid or perfusable media to flow into the manifold inlets 130 at a flow rate ranging from about 1 nL/min to about 100 mL/min, about 10 nL/min to about 10 mL/min, about 100 nL/min to about 1 mL/min, about 1 μL/min to about 1 mL/min, about 1 μL/min to about 100 μL/min, or about 10 μL/min to about 100 μL/min, about 1 mL/min to about 100 mL/min, including values and subranges there therebetween.

In some embodiments, the manifold 140 may include a plate 150 having one or more partitions each configured to receive the bio-assembly 160. For example, a partition may have a recess (e.g., void or chamber surrounded by walls, and in some cases a floor) that is sized and shaped to receive the bio-assembly 160 such that at least a substantial portion of the bio-assembly 160 may be positioned within the walls of the partition when a substrate of the bio-assembly 160 makes contact with a bottom interface of the partition. In some cases, a cross-section of a partition can be square-shaped, rectangle-shaped, etc., and the lateral dimensions of the partition (e.g., length, width, depth, radius, etc., of the partition) can be in the range from about 1 mm to about 100 mm, about 5 mm to about 80 mm, about 10 mm to about 60 mm, about 20 mm to about 50 mm, about 30 mm to about 40 mm, including values and subranges therebetween. In some instances, the bottom interface of the partition can be or include an adhesive interface that is configured to interface with and apply an adhesive to the substrate of the bio-assembly 160 when the bio-assembly 160 is received into the recess or chamber of the partition. In some instances, the number of partitions in a manifold can be in the range from about 1 to about 5,000, about 1 to about 1,536, about 2 to about 768, about 4 to about 384, about 6 to about 192, about 8 to about 96, about 12 to about 48, about 16 to about 32, about 24, including values and subranges therebetween.

In some embodiments, the manifold 140 may also include a manifold inlet 130 and a manifold outlet 170. The manifold inlet 130 may be in fluidic communication with the inlet reservoir 110 and/or the fluid pump 120 to receive the fluid or perfusable media directed or fed into the manifold 140. Further, the manifold inlet 130 may be in fluidic communication with the bio-assembly inlets of the bio-assemblies 160 such the perfusable media received by the manifold inlet 130 is transported to the bio-assemblies 160. For example, the manifold 140 may include multiple partitions each containing therein a bio-assembly 160, and in such cases, the manifold inlet 130 may be in fluidic communication with a network of inlet fluid channels that transport the received perfusable media or fluid from the manifold inlet 130 to the inlets of the multiple bio-assemblies in the multiple partitions.

In some instances, the manifold outlet 170 may be in fluidic communication with the bio-assembly outlets of the bio-assemblies 160 such that perfusates released by or exiting the bio-assemblies 160 via their respective bio-assembly outlets may be discharged out of the manifold 140 via the manifold outlet 170. For example, the manifold outlet 170 may be in fluidic communication with a network of outlet fluid channels, i.e., internal vasculatures, configured to collect perfusates from the bio-assembly outlets and direct the perfusates to the manifold outlet 170. In some cases, the manifold outlet 170 may also be in fluidic communication with the outlet reservoir 180, and may direct the perfusates to the outlet reservoir, which may be configured for storing the perfusates.

In some embodiments, the number of manifold inlets 130 and/or the number of manifold outlets 170 may be small (e.g., 1, 2, 3, 4, 5, 6, 7, 8, 9, 10, etc.). In some of these cases, the number of partitions of the manifold 140 can be rather large, for instance, in the hundreds and thousands (e.g., in the range from about 96 to about 1,536). As such, the embodiments disclose manifolds that provide a fluidic arrangement or architecture that has a small number of "world-to-plate connectors" and is configured to deliver fluids to all or substantially all bio-assemblies 160 of the manifold 140 in an efficient manner. Such manifold architectures have several benefits, such as but not limited to avoiding or limiting leaks and other complications that may occur in biological studies under flow. Further, because several bio-assemblies each containing a bio-scaffold can be used at the same time (e.g., fluids can be directed to each of the bio-assemblies at the same time), the disclosed manifold architecture can significantly improve the efficiency of the microfluidic system 100 for conducting biological studies under flow (e.g., multiple dosages of a drug may be investigated in a single microfluidic setting).

In some embodiments, the manifold 140, including the manifold inlet 130, the plate, and the manifold outlet 170, may be formed using an additive manufacturing technique.

For example, the manifold 140 may be formed using computed axial lithography (CAL) techniques, 3D printing techniques such as but not limited to injection molding techniques, rapid casting, sacrificial molding, and/or the like. In some instances, the manifold 140, including the manifold inlet 130, the plate 150, and the manifold outlet 170 may be formed from plastic materials using 3D printing techniques.

Figure 2A:
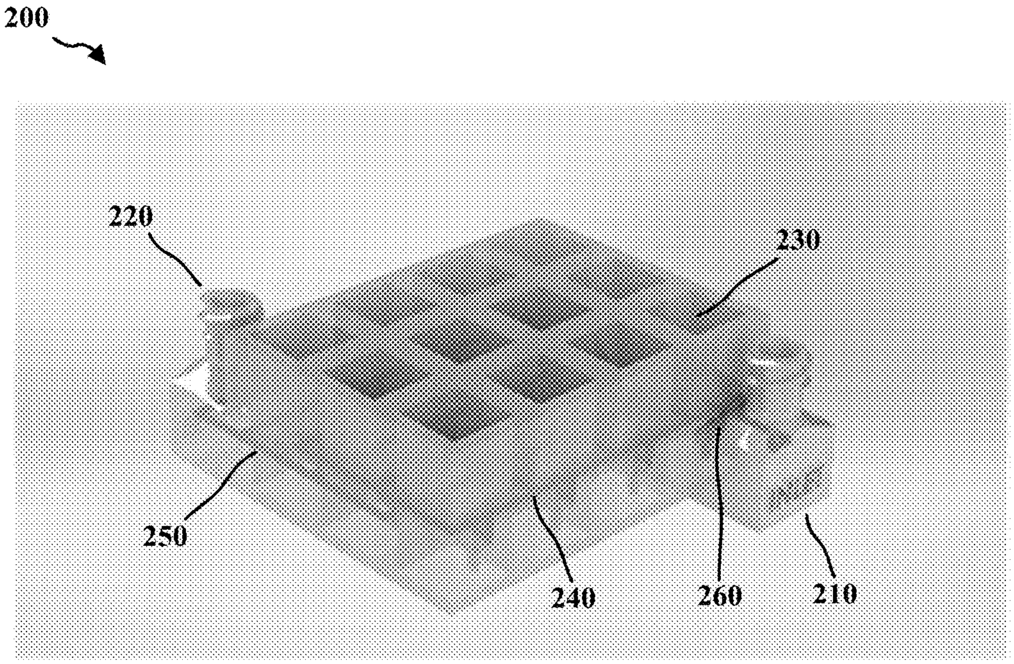
FIGS. 2A and 2B show example implementations of a manifold having multiple partitions and manifold inlet(s) and manifold outlet(s), according to various embodiments.
Figure 2B:
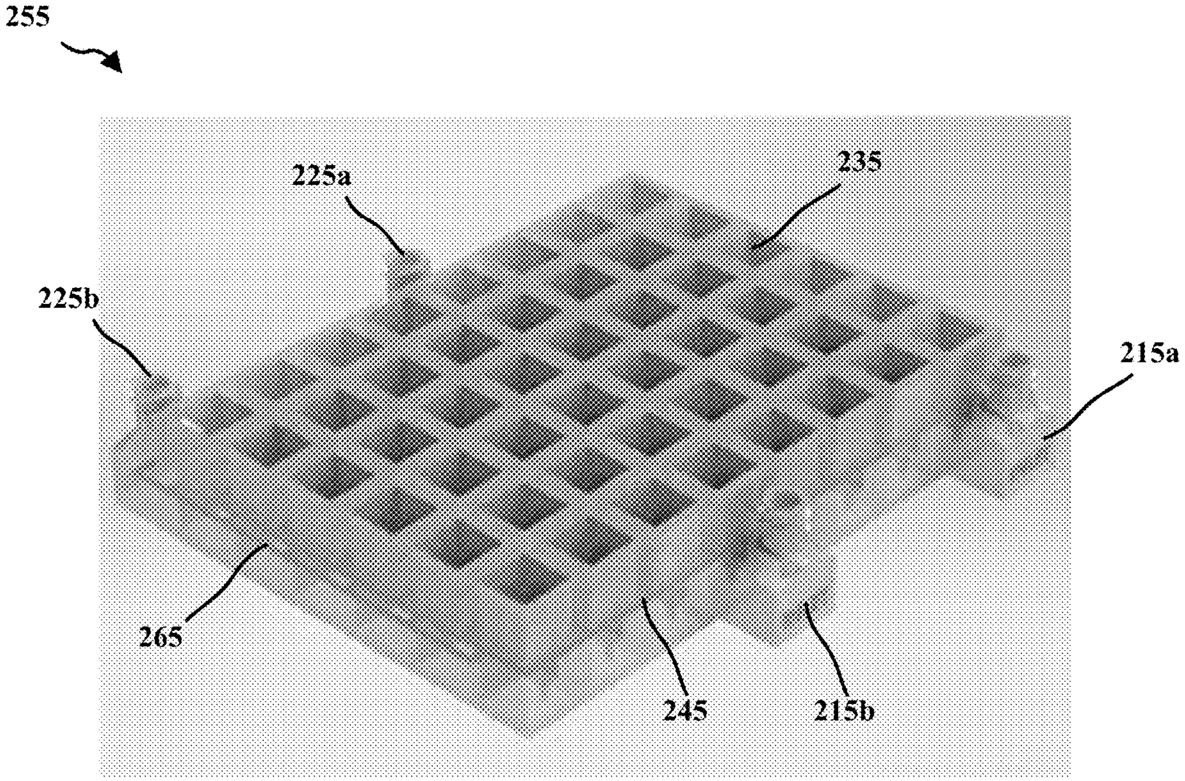

FIGS. 2A and 2B show example implementations of a manifold having multiple partitions, manifold inlet(s) and manifold outlet(s), according to various embodiments. In some embodiments, as noted above, a manifold can have multiple partitions, where one or more of the partitions (e.g., and in some cases, each partition) are configured to receive a bio-assembly having a bio-assembly inlet and a bio-assembly outlet. In some instances, the manifold may have only a single manifold inlet and a single manifold outlet, and the single manifold inlet may be configured to be in fluid communication with the bio-assembly inlets of one or more of the bio-assemblies (e.g., and in some cases each of the bio-assemblies) and the single manifold outlet may be configured to be in fluid communication with the bio-assembly outlets of one or more of the bio-assemblies (e.g., and in some cases each of the bio-assemblies). In some embodiments, the term "fluid communication" may refer to a mechanism such as a channel, vascular component, tube, pipe, or network thereof, etc., that extends between a first component and a second component such that fluid may be transported between the first component and the second component with little or no loss or leak. In some cases, the fluid communication may be unidirectional or bidirectional.

FIG. 2A shows an example illustration of a manifold 200 having a single manifold inlet 210 and a single manifold outlet 220 that are configured to be in fluidic communication with the bio-assembly inlets and the bio-assembly outlets of bio-assemblies that may be received into the partitions 230. In some instances, there may be an inlet fluid channel network 240 connecting the manifold inlet 210 to each partition 230 of the manifold 200 via individual branches 260 of the inlet fluid channel network 240 so that when bio-assemblies are received into the partitions 230, a bio-assembly inlet of a bio-assembly received into a partition 230 may be coupled to the manifold inlet 210 via that branch 260 of the inlet fluid channel network 240 that is connected to the partition 230. As such, the bio-assembly inlets of multiple bio-assemblies in as many or less partitions 230 may be in fluidic communication with the single manifold inlet 210 of the manifold 200 so as to be configured to receive a fluid injected into the manifold 200 via the single manifold inlet 210.

In some instances, there may be an outlet fluid channel network 250 connecting the manifold outlet 220 to each partition 230 of the manifold 200 via individual branches of the outlet fluid channel network 250 so that when bio-assemblies are received into the partitions 230, a bio-assembly outlet of a bio-assembly received into a partition 230 may be coupled to the manifold outlet 220 via that branch of the outlet fluid channel network 250 that is connected to the partition 230. As such, the single manifold outlet 220 of the manifold 200 may be in fluidic communication with the bio-assembly outlets of multiple bio-assemblies in as many or less partitions 230 so as to be configured to receive fluids released from or exiting the multiple bio-assemblies. In some embodiments, the inlet fluid channel network 240 and/or the outlet fluid channel network 250 may include constrictions that are configured (e.g., shaped and sized) to regulate the flow of fluids therein. For instance, the inlet fluid channel network 240 may have multiple branches some or all of which may have a constriction that is configured to at least substantially equalize the flow rate or fluid resistance among the multiple branches. In some instances, the outlet fluid channel network 250 may also have multiple branches, and some or all of these branches may have a constriction that is configured to at least substantially equalize the flow rate or fluid resistance among these multiple branches.

In some embodiments, a manifold may have more than a single manifold inlet and/or a single manifold inlet. In such cases, although there are multiple manifold inlets and/or multiple manifold inlets the number of partitions in the manifold may be much larger than the number of manifold inlets and/or manifold outlets. As such, multiple partitions and bio-assemblies contained therein may be configured to be in fluidic communication with same manifold inlet(s) and/or manifold outlet(s). For example, FIG. 2B shows a manifold 255 having two manifold inlets 215*a*, 215*b*, two manifold outlets 225*a*, 225*b* and forty-eight partitions 235. It is to be understood that FIG. 2B is a non-limiting illustrative example and a manifold can have any number of manifold inlets, manifold outlets and partitions.

In manifolds having more than one inlets 215 and/or more than one outlet 225, in some embodiments, a partition 235 of the manifold 255 can be in fluidic communication with one or more of the manifold inlets 215 and/or one or more of the manifold outlets 225 in a manner similar to as discussed above with reference to FIG. 2A. For example, an inlet fluid channel network 245 may connect one or more of the manifold inlets 215*a*, 215*b* to each partition 235 of the manifold 255 (e.g., and bio-assembly contained therein) so that when bio-assemblies are received into the partitions 235, a bio-assembly inlet of a bio-assembly received into a partition 235 may be coupled to and be in fluidic communication with one or more of the manifold inlets 215*a*, 215*b*. In addition, an outlet fluid channel network 265 may connect one or more of the manifold outlets 225*a*, 225*b* to each partition 235 of the manifold 200 so that when bio-assemblies are received into the partitions 235, a bio-assembly outlet of a bio-assembly received into a partition 235 may be coupled to one or more of the manifold outlets 225*a*, 225*b*. As noted above, the number of partitions 230, 235 in a manifold 200, 255 can be significantly larger than the number of manifold inlets and/or manifold outlets. In such cases, for example with reference to FIG. 2B, the bio-assembly inlets of multiple bio-assemblies in as many or less partitions 235 may be in fluidic communication with the one or more manifold inlets 215*a*, 215*b* of the manifold 255 and the bio-assembly outlets of the multiple bio-assemblies in as many or less partitions 235 may be in fluidic communication with the one or more manifold outlets 225*a*, 225*b* of the manifold 255.

In some embodiments, having a limited number of manifold inlets and manifold outlets in a manifold having a large number of partitions configured to receive multiple bio-assemblies may have several benefits. For example, with reference to FIG. 2A where there is a single manifold inlet 210 for a manifold 200 having multiple partitions 230 each configured to receive a bio-assembly, because each bio-assembly in the partition 230 can be in fluidic communication with the same single manifold inlet 210, the same fluid can be injected via the manifold inlet 210 into each bio-assembly of the multiple partitions 230, providing a user of the manifold 200 improved control with respect to the fluids, and properties thereof, flowing in each bio-assembly of a partition 230. For instance, the fluids in each bio-assembly can have same or at least substantially same fluidic or physical properties, such as but not limited to volume/amount, concentration (e.g., of species present therein), viscosity, temperature, flow rate, etc., allowing the user to have control over the noted properties of the fluids in the bio-assemblies during a biological study.

Another benefit of having a limited number of manifold inlets and manifold outlets in a manifold having a large number of partitions that are configured to receive bio-assemblies is that such manifolds suffer little or none of the complications, such as but not limited to leaks, that are associated with manifolds that have several “world-to-plate” connectors. That is, the manifolds disclosed in the present disclosure have internal vasculatures, i.e., networks of inlet and outlet fluid channels, that allow for a limited number of manifold inlets and manifold outlets to direct fluids efficiently into and out of, respectively, multiple bio-assemblies contained within as many partitions of the manifolds. In some instances, the term “limited number” may be understood in an absolute sense (e.g., numbers in the range from 1 to 10) or may be understood in a comparative sense (e.g., small number of manifold inlets and manifold outlets in comparison to the (large) number of partitions).

Figure 3:
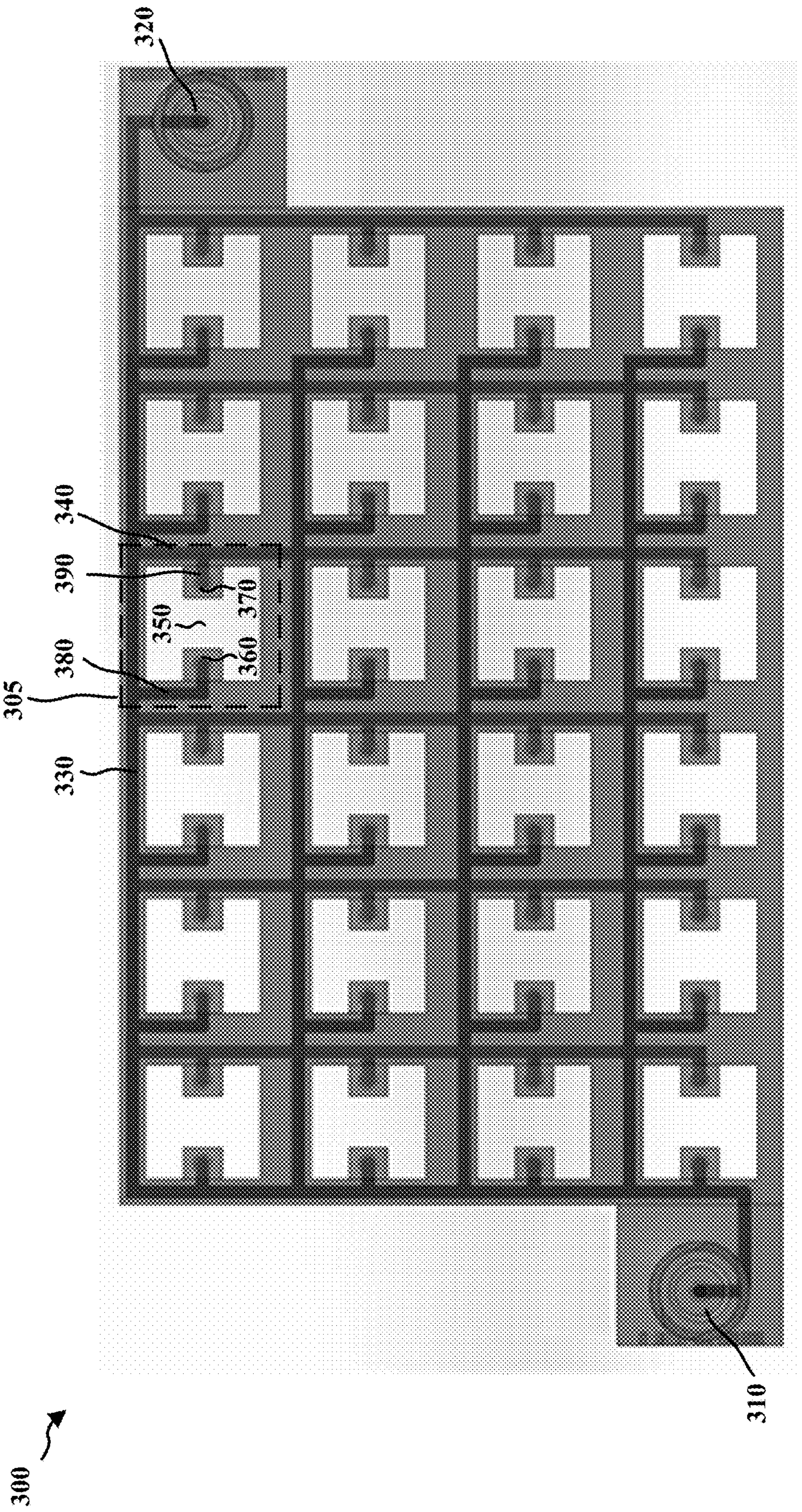
FIG. 3 is a schematic illustration of a manifold having a manifold inlet and a manifold outlet respectively in fluid communication with multiple bio-assembly inlets and bio-assembly outlets of bio-assemblies contained within the manifold, according to various embodiments.

FIG. 3 provides a schematic illustration of a manifold 300 having the afore-mentioned internal vasculatures, i.e., networks of inlet fluid channels 330, 380 and outlet fluid channels 340, 390 that allow for a limited number of manifold inlets and manifold outlets (e.g., a single manifold inlet 310 and a single manifold outlet 320) to direct fluids efficiently into and out of, respectively, bio-assemblies contained within the partitions 305 of the manifold, according to various embodiments. As shown in the example embodiment of FIG. 3, a single manifold inlet 310 is configured to be in fluidic communication with a bio-assembly inlet 360 of a bio-assembly 350 contained within the partition 305 via an internal inlet vasculature that includes the network of inlet fluid channels 330, 380. Further, a single manifold outlet 320 is also configured to be in fluidic communication with a bio-assembly outlet 370 of the bio-assembly 350 via an internal outlet vasculature that includes the network of outlet fluid channels 340, 390. Although the discussion herein refers to a single partition 305 of the manifold 300 and the bio-assembly 350 received or contained therein, it equally applies to any of the other partitions and bio-assemblies of the manifold 300.

As noted above, in some embodiments, the internal vasculatures of the manifold 300 that include the network of inlet fluid channels and outlet fluid channels allow for a large number of partitions and bio-assemblies contained within (e.g., in the range from about 1 to about 1,536) to be in fluidic communication with a limited number of manifold inlets and manifold outlets (e.g., one in each case). Such fluidic architecture or arrangement may facilitate for fluids injected into the manifold via the limited number of manifold inlets to flow through the network of inlet fluid channels and enter the bio-assemblies via the respective bio-assembly inlets, and to leave the bio-assemblies via the bio-assembly outlets to enter into the network of outlet fluid channels to eventually exit the manifold via the limited number of manifold outlets. That is, with reference to partition 305 of manifold 300, fluid injected into the manifold fluid inlet 310 (e.g., from an inlet fluid reservoir) may flow via the inlet fluid channel 330 and branch into inlet fluid channel 380 to enter the bio-assembly 350 contained within the partition 305 via the bio-assembly inlet 360. The fluid may then flow through the bio-assembly 350, as discussed below, before exiting the bio-assembly 350 via the bio-assembly outlet 370 into the branch outlet fluid channel 390 and outlet fluid channel 340 to finally flow out of the manifold 300 via the manifold outlet 320. As noted above, the above discussion equally applies in an analogous manner to any of the other partitions of manifold 300. As such, the internal vasculatures of the manifold 300 allows for an efficient delivery of fluids to, and discharge from, the manifold 300 using minimal number of manifold 300 inlets and outlets when the manifold 300 has a large number of partitions (e.g., the number of partitions far exceeding the number of manifold inlets/outlets).

Figure 4:
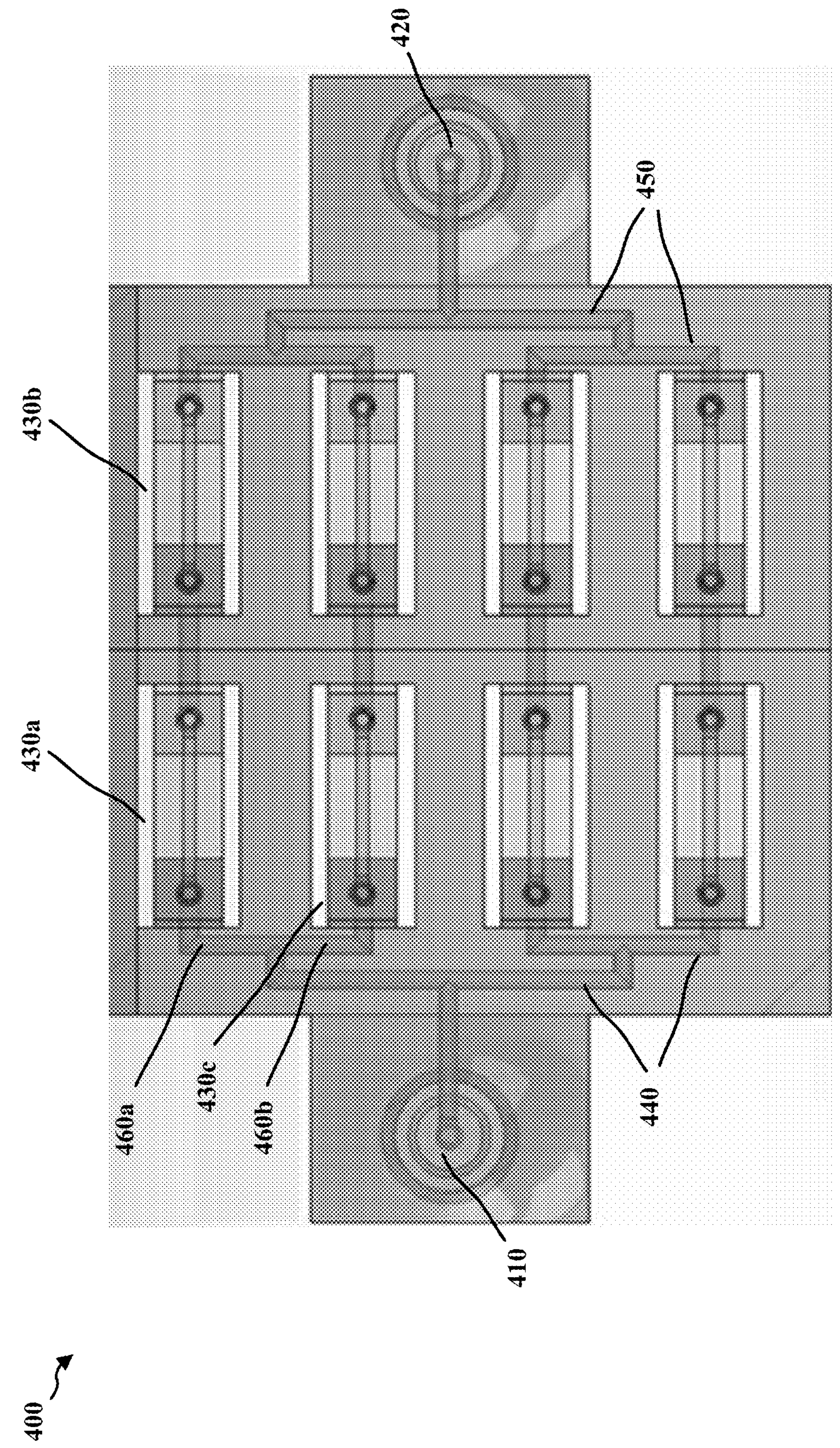
FIG. 4 is a schematic illustration of a manifold having bio-assemblies in series and parallel fluid communications with each other, according to various embodiments.

FIG. 4 is a schematic illustration of a manifold having bio-assemblies in series and parallel fluid communications with each other, according to various embodiments. In some embodiments, a manifold 400 may have a manifold inlet 410 that is in fluid communication with partitions containing therein bio-assemblies 430 which in turn may be in fluid communication with a manifold outlet 420. As discussed above, a bio-assembly 430 received into or contained within a partition of the manifold 400 may have a bio-assembly inlet that is in fluid communication with the manifold inlet 410 via a network of inlet fluid channels or inlet vasculature 440 and a bio-assembly outlet that is in fluid communication with the manifold outlet 420 via a network of outlet fluid channels or outlet vasculature 450. As such, a fluid injected from an inlet reservoir into the manifold 400 (e.g., by a fluid pump) via the manifold inlet 410 may flow from the manifold inlet 410 to the bio-assemblies 430 via the inlet vasculature 440 and exit the bio-assemblies 430 into the outlet vasculature 450 before being released from the manifold 400 via the manifold outlet 420 into, for instance, an outlet reservoir.

In some embodiments, the network of inlet and outlet fluid channels of the manifold 400 may be arranged such that at least some of the bio-assemblies 430 may be in series fluid communication with each other. In some embodiments, the network of inlet and outlet fluid channels of the manifold 400 may be arranged such that at least some of the bio-assemblies 430 may be in parallel fluid communication with each other. And yet in some embodiments, the network of inlet and outlet fluid channels of the manifold 400 may be arranged such that at least some of the bio-assemblies 430 may be in a combination of series and parallel fluid communications with each other. For example, with reference to FIG. 4, a first bio-assembly **430*a* may be in series fluid communication with a second bio-assembly 430*b*, the first bio-assembly 430*a* (and the second bio-assembly 430*b*) may be in parallel fluid communication with the third bio-assembly 430*c*, and the first bio-assembly 430*a*, the second bio-assembly 430*b*, and the third bio-assembly 430*c*** may be in a combination of series and parallel fluid communication with each other.

In some instances, the internal architecture or arrangement of the network of inlet and outlet fluid channels 440, 450 that allows for series and/or parallel fluid communications between the bio-assemblies 430 may facilitate control over the distribution of fluid flow to the various bio-assemblies 430. For example, to conduct a biological investigation that includes studying a fluid by-product of some interaction between a cell culture and a drug perfusates, in some cases, the cell culture perfusate may be injected into or otherwise placed in the scaffold of the bio-assembly **430*a* and the drug perfusate may be directed to flow through the bio-assembly 430*a* (e.g., and as such, interact with the cells in the bio-scaffold of the bio-assembly 430*a*) before coming out via the bio-assembly outlet of the bio-assembly 430*a* as a fluid by-product to be directed to the bio-assembly 430*b* for further study and analysis. As another example, if the biological investigation includes a study to determine the effect of same fluid on two different samples, the two different samples may be placed in the bio-scaffolds of the first bio-assembly 430***a* and the third bio-assembly 430*c* and a fluid may be injected into the manifold 400 via the manifold inlet 410. In such instances, because the first bio-assembly 430*a* and the third bio-assembly 430*c* are in parallel fluid communication with each other (e.g., and in cases where the fluid channel branches 460*a* and 460*b* are substantially identical to each other), the fluids arriving at the first bio-assembly 430*a* and the third bio-assembly 430*c* may be at least substantially similar, i.e., have same or substantially similar physical properties such as but not limited to concentration (e.g., of species present therein such as but not limited to solutes, solvents, etc.), volume, flow rate, temperature, viscosity, etc.

Figure 5:
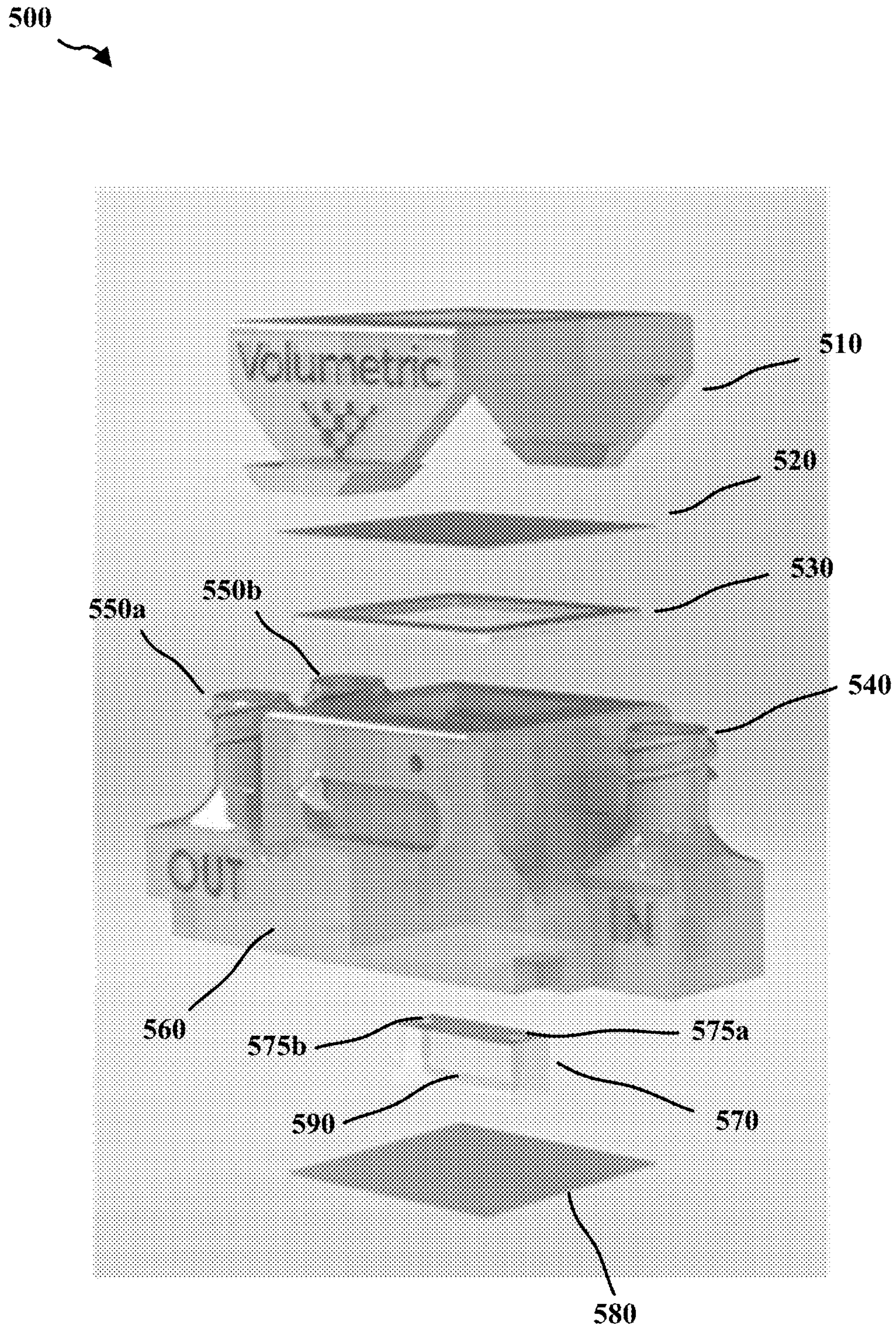
FIG. 5 is a schematic illustration of an exploded view of a bio-assembly having a bio-scaffold, according to various embodiments.

FIG. 5 is a schematic illustration of an exploded view of a bio-assembly, according to various embodiments. In some embodiments, the bio-assembly 500 may include a lid 510, a barrier 520, a seal 530, a housing 560, a bio-scaffold 570 and a substrate 580. In some instances, the barrier 520 may be a transparent barrier that is configured to be affixed to the lid 510 of the bio-assembly 500. For example, the barrier 520 can be a transparent plastic or glass cover slip configured to be affixed to the lid 510 via an adhesive. As such, in some cases, the barrier 520 can also serve as a window allowing one to view the interior of the bio-assembly 500 from above the lid 510. In some instances, the barrier 520 may also be affixed to the lid 510 using any other attachment technique configured to attach or affix the barrier 520 to the lid 510, such as but not limited to an interlocking latch. In some instances, the lid 510 can be made from a plastic material. Further, in some cases, the adhesive can include a tape such as but not limited to an acrylic tape adhesive (e.g., 3M LSE9474), a liquid adhesive/glue such as but not limited to a 2-part epoxy, a photo-activated epoxy, a cyanoacrylate, an ultra-violet (UV) curable material, a bio-compatible, a cyto-compatible adhesive, etc. Although shown in FIG. 1 as two separate components of the bio-assembly 500, in some instances, the lid 510 and the barrier 520 can be a single component (e.g., an integral component, or a separable one that can be separated into the lid 510 and the barrier 520). In some embodiments, the lateral dimensions of the bio-assembly 500 (e.g., length, width, depth, radius, etc.) can be in the range from about 0.1 μm to about 5 mm, about 1 μm to about 1 mm, about 5 μm to about 0.1 mm, about 10 μm to about 50 μm, about 20 μm to about 25 μm, including values and subranges therebetween.

In some embodiments, the seal 530 may be configured to provide an air-tight, water/fluid-tight, dust-tight, etc., seal between the barrier 520 and the housing 560, an example of which includes a gasket or an O-ring. For example, the seal 530 may be configured to be affixed or attached to the barrier 520 and/or the housing 560 when the seal 530 contacts the barrier 520 and/or the housing 560, respectively. For instance, the seal 530 may be a double-sided adhesive that, when positioned between the barrier 520 and the housing 560, attaches to both the barrier 520 and the housing 560 such that an air-tight, water/fluid-tight, dust-tight, etc., seal or attachment forms at the seams, preventing air, water/fluid, dust, etc., from entering the bio-assembly 500 thereby.

In some embodiments, the housing 560 may be a hollow component with one or more bio-assembly inlets 540 and one or more bio-assembly outlets 550*a*, 550*b*, and an interior chamber or void configured (e.g., shaped and sized) to receive within the interior space the scaffold 570. In some instances, the housing 560 may be made from materials such as but not limited to resin (e.g., biocompatible), polycarbonate, acrylic, glass, plastics, etc. In some instances, the housing 560 may have an internal network of bio-assembly inlet fluid channels (i.e., bio-assembly inlet vasculature) that are in fluid communication with the bio-assembly inlet 540 and configured to direct fluid coming into the bio-assembly 500 via the bio-assembly inlet 540 to desired locations within the bio-assembly 500, such as but not limited to the bio-scaffold inlet 575*a*. That is, for example, with the bio-scaffold 570 positioned within the interior space of the housing 560, when fluid from a manifold inlet (e.g., manifold inlet 210 in FIG. 2, manifold inlet 310 in FIG. 3, etc.) flow into the bio-assembly 500 via the bio-assembly inlet 540, the fluid can traverse the bio-assembly 500 via the internal bio-assembly inlet vasculature to arrive at the bio-scaffold inlet 575*a* and enter the bio-scaffold 570.

In some instances, the housing 560 may have an internal network of bio-assembly outlet fluid channels (i.e., bio-assembly outlet vasculature) that is in fluid communication with the bio-assembly outlet 550*a* and configured to direct fluid coming from within the bio-assembly 500, such as but not limited to the bio-scaffold outlet 575*b*, to the bio-assembly outlet 550*a* for releasing to the manifold outlet (e.g., manifold inlet 220 in FIG. 2, manifold inlet 320 in FIG. 3, etc.). That is, for example, after fluid enter the bio-scaffold 570 via the bio-scaffold inlet 575*a*, the fluid may traverse the bio-scaffold 570 via the bio-scaffold fluid channel or vascular component 590 to exit via the bio-scaffold inlet 575*b*. In such cases, the bio-assembly outlet vasculature, which may be in fluid communication with the bio-scaffold outlet 575*b*, may receive the fluid from the bio-scaffold inlet 575*b* and transport the fluids to the bio-assembly outlet 550*a* for releasing out of the bio-assembly 500 via the bio-assembly outlet 550*a*.

Figure 6:
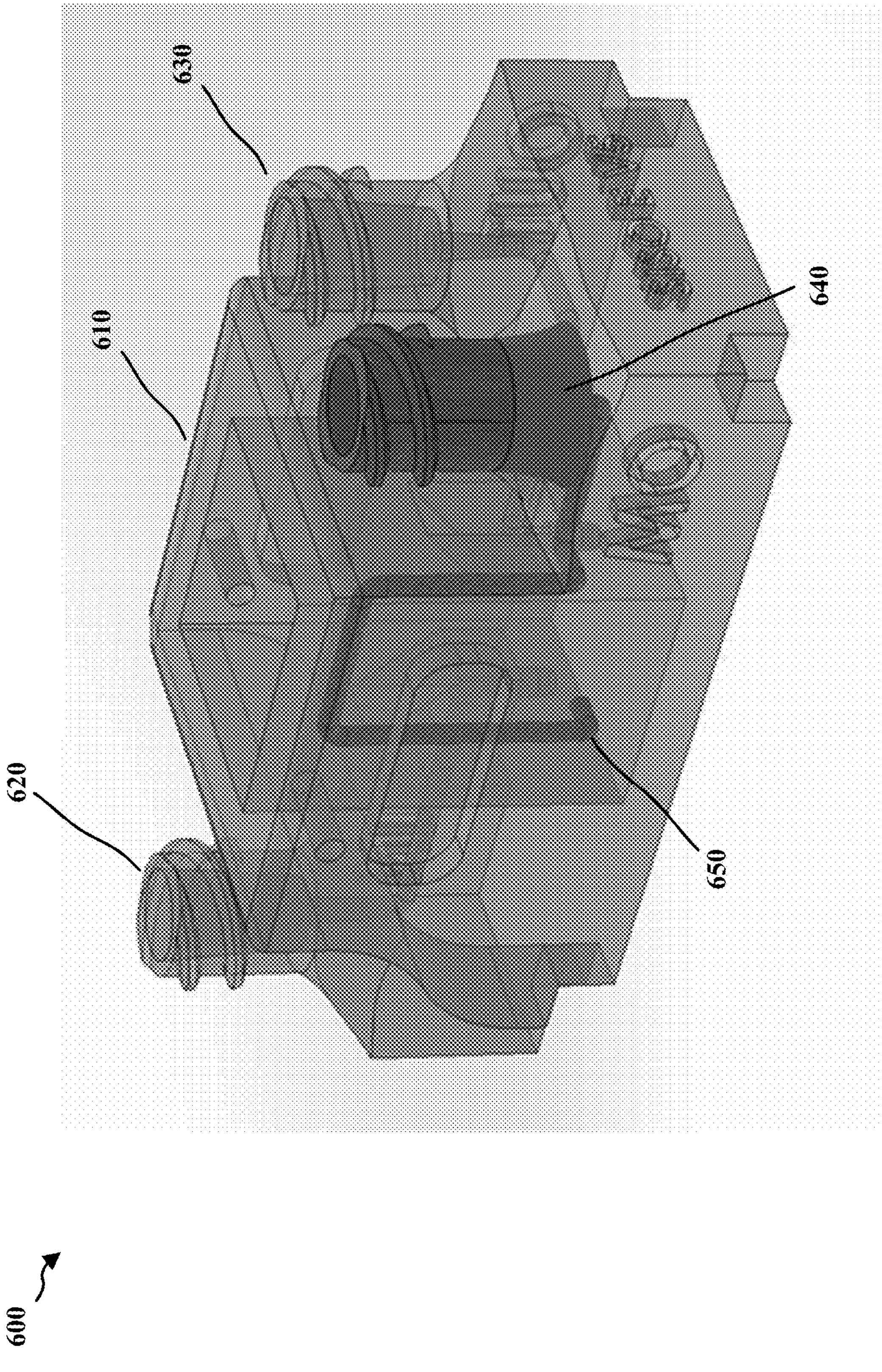
FIG. 6 is a schematic illustration of a trimetric view of a bio-assembly having a bio-scaffold access channel, according to various embodiments.

In some embodiments, as noted above, the bio-assembly 500 may include more than one bio-assembly outlets 550*a*, 550*b*. In some instances, one of these bio-assembly outlets (e.g., bio-assembly outlet 550*b*) may be coupled to or be in fluidic communication with a bio-scaffold access channel that is configured to transport fluids between the interior of the bio-assembly 500 and/or the partition in which the bio-assembly 500 is located, and the exterior of the bio-assembly 500. FIG. 6 shows a schematic illustration of a trimetric view of a bio-assembly having a bio-scaffold access channel, according to various embodiments. In some embodiments, the bio-assembly 600 may include a housing 610 that has a bio-assembly inlet 620, a first bio-assembly outlet 630 and a second bio-assembly outlet 640. In some instances, the first bio-assembly outlet 630 may be similar or identical to the bio-assembly outlet 550*a*, and the discussion above about bio-assembly outlet 550*a* with reference to FIG. 5 may also apply to the first bio-assembly outlet 630. The second bio-assembly outlet 640 may be coupled to a bio-scaffold access channel or fluid line 650 that is configured to transport fluids between the interior of the bio-assembly 600 and the exterior of the bio-assembly 600 via the second bio-assembly outlet 640.

For example, a biological investigation conducted using a manifold (such as 200 or 255 shown in FIGS. 2A-2B) with each partition 230, 235 having therein a bio-assembly (such as 600 in FIG. 6) may include cell culture media fluid or perfusate flowing through the bio-scaffold of the bio-assembly 600. In some instance, there may be a need to add or remove additional fluids or media into the interior of the bio-assembly 600, for example, to the bio-scaffold of the bio-assembly 600. In some instances, the bio-scaffold access channel 650 may be physically coupled to or be in fluid communication with the bio-scaffold, the internal network of bio-assembly inlet fluid channels of the bio-assembly 600, and/or the internal network of bio-assembly outlet fluid channels of the bio-assembly 600. In such cases, the second bio-assembly outlet 640 may be used to introduce the additional fluids, via the bio-scaffold access channel 650, into the interior of the bio-assembly (e.g., to the bio-scaffold) such that the additional fluids or media may arrive at the bio-scaffold. For example, fixatives configured to preserve biological tissues in the bio-scaffold of the bio-assembly 600 may be introduced into the bio-assembly 600 and delivered to the bio-scaffold via the bio-scaffold access channel 650 at the end of a biological investigation.

In some cases, the second bio-assembly outlet 640 may also be used to extract fluids from the interior of the bio-assembly and/or the bio-scaffold to outside the bio-assembly 600 via the bio-scaffold access channel 650. For example, a fluid pump that is in fluid communication with the second bio-assembly outlet 640 and configured to pump fluids out the second bio-assembly outlet 640 may be used fluids (e.g., leaks) in the interior of the housing 610. For instance, during a biological investigation of a cell culture media located in the bio-scaffold of the bio-assembly 600, an investigator may wish to access a sample of the cell culture media in the bio-scaffold to quantify the cell response of the cell culture media to an assay. In such cases, the investigator may extract the sample from the bio-scaffold/bio-assembly 600 via the bio-scaffold access channel 650 and the second bio-assembly outlet 640. As such, the bio-scaffold access channel 650 can provide fluidic access to the bio-scaffold, the internal network of inlet fluid channels of the bio-assembly 600, and/or the internal network of outlet fluid channels of the bio-assembly 600 such that media/fluids may be introduced into, and extracted out of, the interior of the bio-assembly and/or the bio-scaffold using the bio-scaffold access channel 650 and the second bio-assembly outlet 640. In some instances, the bio-scaffold access channel 650 may be in fluid communication with the internal network of outlet fluid channels of the manifold in which the bio-assembly 600 is positioned, and as such may direct fluids extracted from the interior of the bio-assembly 600 to these outlet fluids channels for the fluids to be released out of the manifold via the manifold outlet(s). It is to be understood that the above examples are non-limiting and that the bio-scaffold access channel 650 may be used for other purposes, such as removing gas bubbles, etc., from the interior of the bio-assembly, etc.

In some embodiments, the bio-scaffold access channel 650 may include a gravitational barrier to prevent or at least reduce leakage between the bio-assemblies or partitions in a manifold. In some instances, the bio-scaffold access channel 650 may be configured to allow media (e.g., phosphate buffered saline (PBS)) to be added into the well or the interior of the housing 610 so that the bio-scaffold (e.g., hydrogel) does not dry out over time (e.g., which can be harmful because the cells within the bio-scaffold may then dry out slowly over time as well). In some instances, the bio-scaffold or hydrogel may be placed in an incubator at a temperature ranging from about 35° C. to about 40° C. (e.g., about 37° C.) and as such, without media (e.g., such as PBS) being added into the well or interior of the housing 610 to prevent the bio-scaffold or hydrogel from drying out, the cells within may dry out over time. In some cases, the media may be added regularly or periodically to prevent or at least reduce the drying out of the bio-scaffold or hydrogel or the cells within.

Figure 7B:
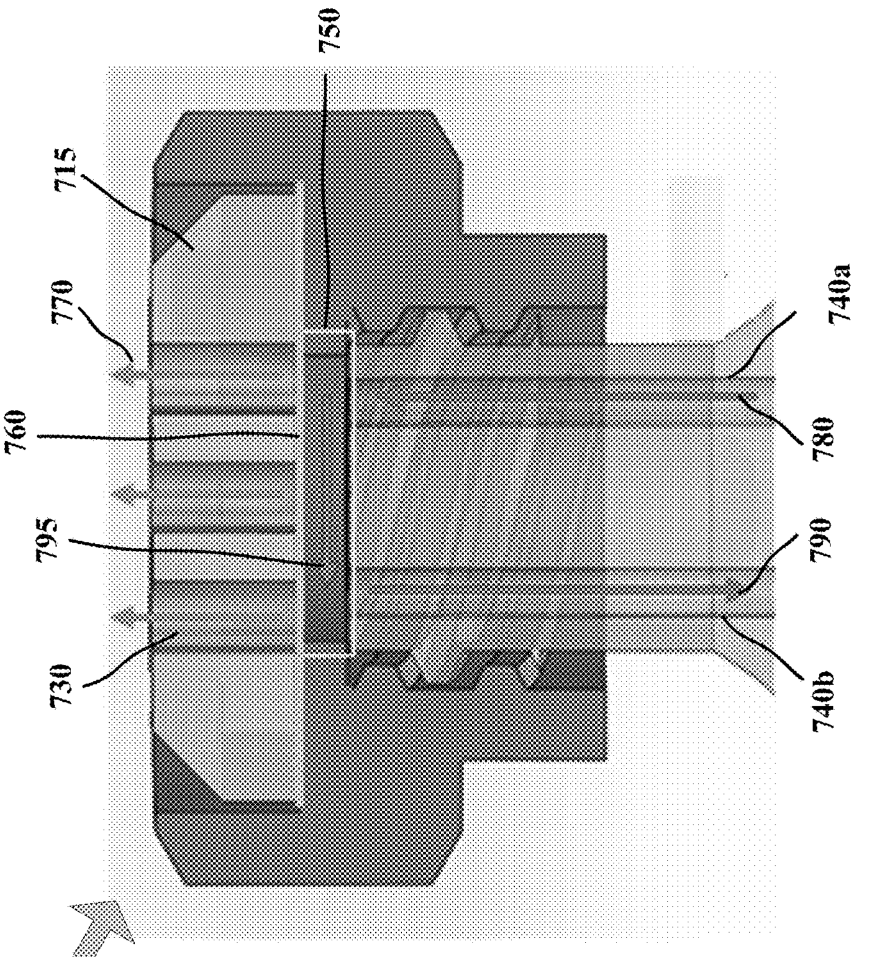
FIGS. 7A-7B show schematic illustrations of bubble outlet for removing gas or air from fluids flowing in the fluid channels of a manifold, according to various embodiments.
Figure 7A:
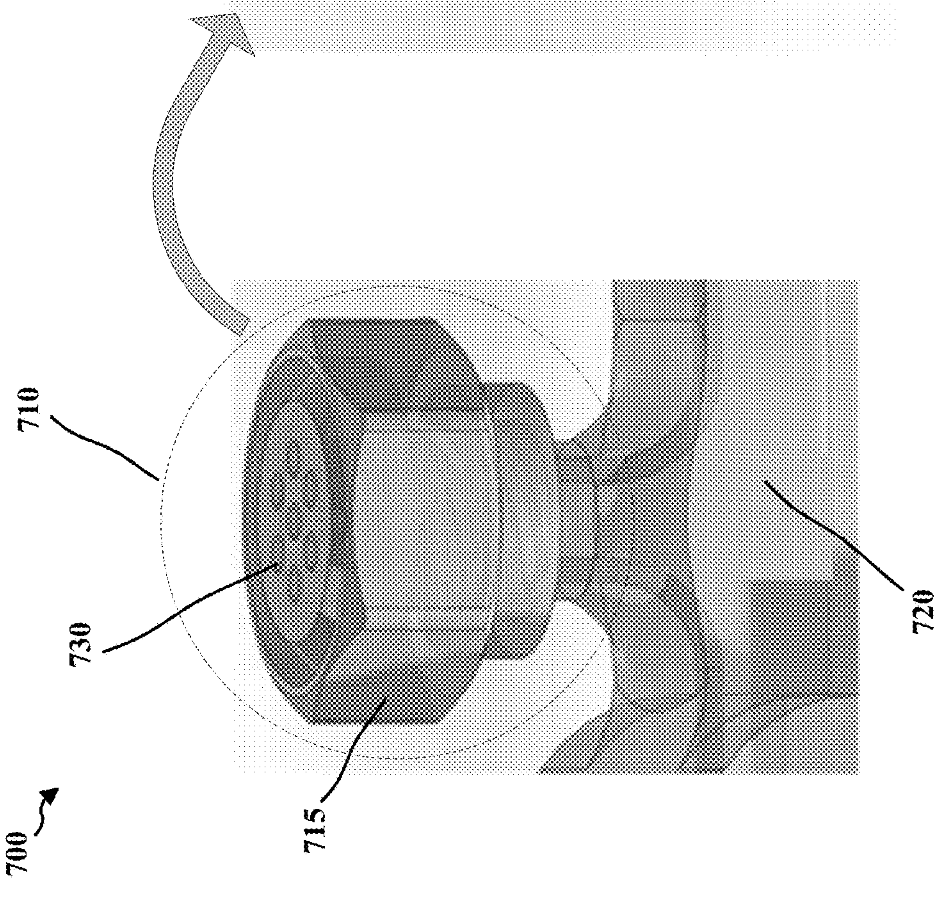

In some embodiments, gas bubbles may be removed from a manifold before reaching a bio-assembly (and as such, before reaching a bio-scaffold) with the use of a bubble outlet positioned upstream from the bio-assembly on a fluid line or channel of the network of inlet fluid channels of the manifold. In some instances, gas bubbles entrained in microfluidic systems such as the manifolds disclosed herein may cause problems during biological investigations conducted using the manifolds, such as but not limited to blockage of fluid flow, damage to cells in cell culture media or fluids, denaturing of proteins in fluids/media, and/or the like. FIGS. 7A-7B show schematic illustrations of a bubble outlet configured for removing gas or air entrained in fluids flowing in the fluid channels of a manifold, according to various embodiments. In some embodiments, FIG. 7A shows a dimetric view of a bubble trap or outlet 710 having a top cover 715 with pores 730 and positioned on a fluid channel 720 of a manifold (e.g., a fluid channel of the networks of inlet fluid channels 330, 380 in FIG. 3). In some instances, the bubble outlet 710 may be positioned at least substantially vertically above the fluids flowing within the fluid channel 720. That is, to facilitate the removal of gas bubbles entrained in fluids flowing through the fluid channels or fluid lines of a manifold, bubble outlets 710 may be placed on the fluids channels vertically above the fluids, so that the entrained gases can migrate towards the bubble outlet 710 for removal from the fluids and manifold.

In some embodiments, FIG. 7B shows a cross-sectional view of the bubble outlet 710 which includes an inlet fluid line **740*a* for receiving or directing fluid 780 (e.g., fluid with gas bubbles entrained therein) from the fluid channel 720 into the bubble outlet 710. In some instances, the bubble outlet 710 may also include a well 750 configured to allow the received fluid 780 traverse through the well 750 while the gas bubbles entrained in the traversing received fluid 795 migrate towards the pores 730 on the top surface of the bubble outlet 710, leaving behind a fluid 790 with little or no entrained gas bubble. Further, the bubble outlet 710 may also include an outlet fluid line 740*b* configured to return or direct the fluid 790 (e.g., after the removal of at least a substantial portion of the gas bubbles entrained in the received fluid) to the fluid channel 720** for delivery to a bio-assembly via a bio-assembly inlet (e.g., of the bio-assembly).

In some instances, the bubble outlet 710 may include a filter membrane 760 positioned between the well 750 and the pores 730 of the top cover 715 that is configured to filter out the gas bubbles migrating away from the traversing received fluid 795. In some cases, the filter membrane 760 can be a hydrophobic membrane with micropores that is configured to repel the liquid in the traversing received fluid 795 while allowing the gas bubbles 770 entrained in the traversing received fluid 795 to escape via the micropores of the membrane and the pores 730 of the top cover 715 of the bubble outlet 710. In some cases, the filter membrane 760 can be a hydrophobic membrane such as but not limited to polytetrafluoroethylene (PTFE), polymethylmethacrylate (PMMA), etc. In some instances, the filter membrane 760 is configured to be secured to the top cover 715 via an adhesive such as but not limited to a tape, a liquid adhesive/glue, etc. In some instances, the micropores can have a lateral dimension (e.g., radius, diameter, etc.) ranging from about 0.01 m to about 100 m, about 0.02 m to about 10 m, about 0.05 m to about 1 m, about 0.1 m to about 0.5 m, about 0.15 m to about 0.35 m, about 0.2 m to about 0.4 m, about 0.21 m to about 0.25 m, including values and subranges therebetween. Further, the surface area of the filter membrane 760 may be configured to enhance or maximize the rate of gas bubble escape from the traversing received fluid 795 in the well 750. For example, the surface area of the filter membrane 760 may be no less than the bottom surface of the top cover 715 that contains the pores 730 so that the amount of gas bubbles escaping through the micropores of the filter membrane 760 and the pores 730 of the top cover 715 may be enhanced or optimized.

Returning to FIG. 5, in some embodiments, the bio-assembly 500 includes the bio-scaffold 570 configured to be affixed or attached to the substrate 580. In some instances, the bio-scaffold 570 may be affixed or attached to the substrate 580 via any suitable bonding techniques, including but not limited to covalently bonding the bio-scaffold 570 to a top surface of the substrate 580. For example, a heterobifunctional chemical group having two different reactive functional groups may be used to attach the bio-scaffold 570 to the substrate 580, where one functional group is configured to be attached to the substrate 580 and the other functional group is configured to be attached to the bio-scaffold 570, thereby effectively affixing the bio-scaffold 570 to the substrate 580. For instance, the substrate 580 may be chemically functionalized using a heterobifunctional chemical crosslinker that includes a trichlorosilane and a methacrylate, where the former is configured to bond to the substrate 580 and the latter is configured to bond to the bio-scaffold 570 when the heterobifunctional chemical crosslinker contacts the bio-scaffold 570 and the substrate 580, respectively.

In some instances, in addition to or instead of using covalent bonding techniques, the bio-scaffold 570 may be attached to the substrate 580 via adhesives such as but not limited to tapes, liquid adhesives/glues, etc. In some cases, the bio-scaffold 570 may be disposed on the substrate 580 without covalent bonding and/or adhesives.

In some embodiments, the bio-scaffold 570 can be a gel, a hydrogel, polymerizable hydrogel including, for example, water and poly(ethylene glycol) diacrylate (PEGDA) having 6 kDa, 20 weight %, lithium acylphosphinate (LAP) which absorbs in the ultraviolet to visible light wavelength range, gelatin methacrylate, or any other suitable hydrogel materials, including but not limited to any of collagen methacrylate, silk methacrylate, hyaluronic acid methacrylate, chondroitin sulfate methacrylate, elastin methacrylate, cellulose acrylate, dextran methacrylate, heparin methacrylate, NIPAAm methacrylate, Chitosan methacrylate, polyethylene glycol norbornene, polyethylene glycol dithiol, thiolated gelatin, thiolated chitosan, thiolated silk, PEG based peptide conjugates, or any combination thereof. Further, the bio-scaffold 570 can include any material, including those listed above, that is 3D printable or moldable, including for example, via injection molding techniques, rapid casting or sacrificial molding. In some instances, the bio-scaffold 130 can be formed via casting around a pattern, such as a needle or a structure, which can be removed mechanically, chemically, and/or by light-induced degradation, followed by patterning one or more pieces and then bonding the pieces together.

In some embodiments, the bio-scaffold 570 can be perfusable hydrogels. In some instances, the bio-scaffold 570 can include aqueous pre-hydrogel solutions containing organic materials, such as for example, tartrazine (yellow food coloring FD&C Yellow 5, E102), curcumin (from turmeric), or anthocyanin (from blueberries) each of which can yield hydrogels, and inorganic gold nanoparticles having a diameter, for example, from about 5 nm to 100 nm, for biocompatibility and light attenuating properties, and for functionalities for acting as, for example, an effective photoabsorbing additive to generate perfusable hydrogels. In some instances, the bio-scaffold 570 can include a photoabsorber. In some cases, the photoabsorber can be hydrophilic. For example, a hydrophilic photoabsorber can be one of a food dye, tartrazine, Sunset Yellow FCF (Yellow No. 6), Brilliant Blue FCF (FD&C Blue No. 1), indigo carmine (FD&C Blue No. 2), Fast Green FCF (FD&C Green No. 3) anthocyanins, anthocyanidin, erythrosine (FD&C Red No. 3), Allura Red AC (FD&C Red No. 40), riboflavin (Vitamin B2, E101, E101a, E106), ascorbic acid (vitamin C), Quinoline Yellow WS, carmoisine (azorubine), Ponceau 4R (E124), Patent Blue V (E131), Green S (E142), Yellow 2G (E107), Orange GGN (E111), Red 2G (E128), caramel color, phenol red, methyl orange, 4-nitrophenol, NADH disodium salt, or any combination thereof. In some cases, the photoabsorber can be hydrophobic. For example, the hydrophobic photoabsorber can be one of curcumin (E100), turmeric, alpha carotene, beta carotene, canthaxanthin (keto-carotenoid), cochineal extract, paprika, saffron, ergocalciferol (vitamin D2), cholecalciferol (vitamin D3), Citrus Red 2, annatto extract, Lycopene, or any combination thereof.

In some embodiments, the bio-scaffold 570 can be or include a biomaterial comprising silk, collagen, gelatin, fibrin, synthetic peptides, hyaluronic acid, polymers comprising alginate, polyurethane, polycaprolactone (PCL), elastomers, collagen methacrylate, collagen methacrylamide, gelatin methacrylate, gelatin methacrylamide, silk methacrylate, silk methacrylamide, hyaluronic acid methacrylate, hyaluronic acid methacrylamide, pluronic diacrylate, pluronic methacrylamide, chondroitin sulfate methacrylate, chondroitin sulfate methacrylamide, elastin methacrylate, elastin methacrylamide, cellulose acrylate, cellulose methacrylamide, dextran methacrylate, dextran methacrylamide, heparin methacrylate, heparin methacrylamide, N-isopropyl acrylamide (NIPAAm), chitosan methacrylate, chitosan methacrylamide, polyethylene glycol norbornene, polyethylene glycol dithiol, thiolated gelatin, thiolated chitosan, thiolated hyaluronic acid, thiolated silk, PEG based peptide conjugates, decellularized ECM of any tissue/organ, plastic, metal (such as gallium or indium, or alloys such as Field's metal, gallium-indium, gallium-tin, and gallium-indium-tin), supercooled liquid metal, or any combination thereof.

In some embodiments, the bio-scaffold 570 may include a bio-scaffold inlet 575*a*, a bio-scaffold outlet 575*b*, and one or more fluid channels or vascular components 590 extending therebetween configured to allow fluids entering the bio-scaffold 570 via the bio-scaffold inlet 757*a* to traverse the bio-scaffold 570 before exiting via the bio-scaffold outlet 575*b*. In some instances, the one or more vascular components 590 may include one or more channels that may branch out as a tree-like structure within the bio-scaffold 570. For example, the one or more channels may include branches that can form, for example, as a torus knot, wherein the channels re-converge at another point within the bio-scaffold 570. As another example, the one or more vascular components 590 may include branched structures that can extend from various portions of the bio-scaffold 570 and terminate at other portions within the bio-scaffold 570. In some instances, the one or more vascular components 590 can have a multiscale vasculature having branches and taperings similar to that of organs in human body.

Figure 8:
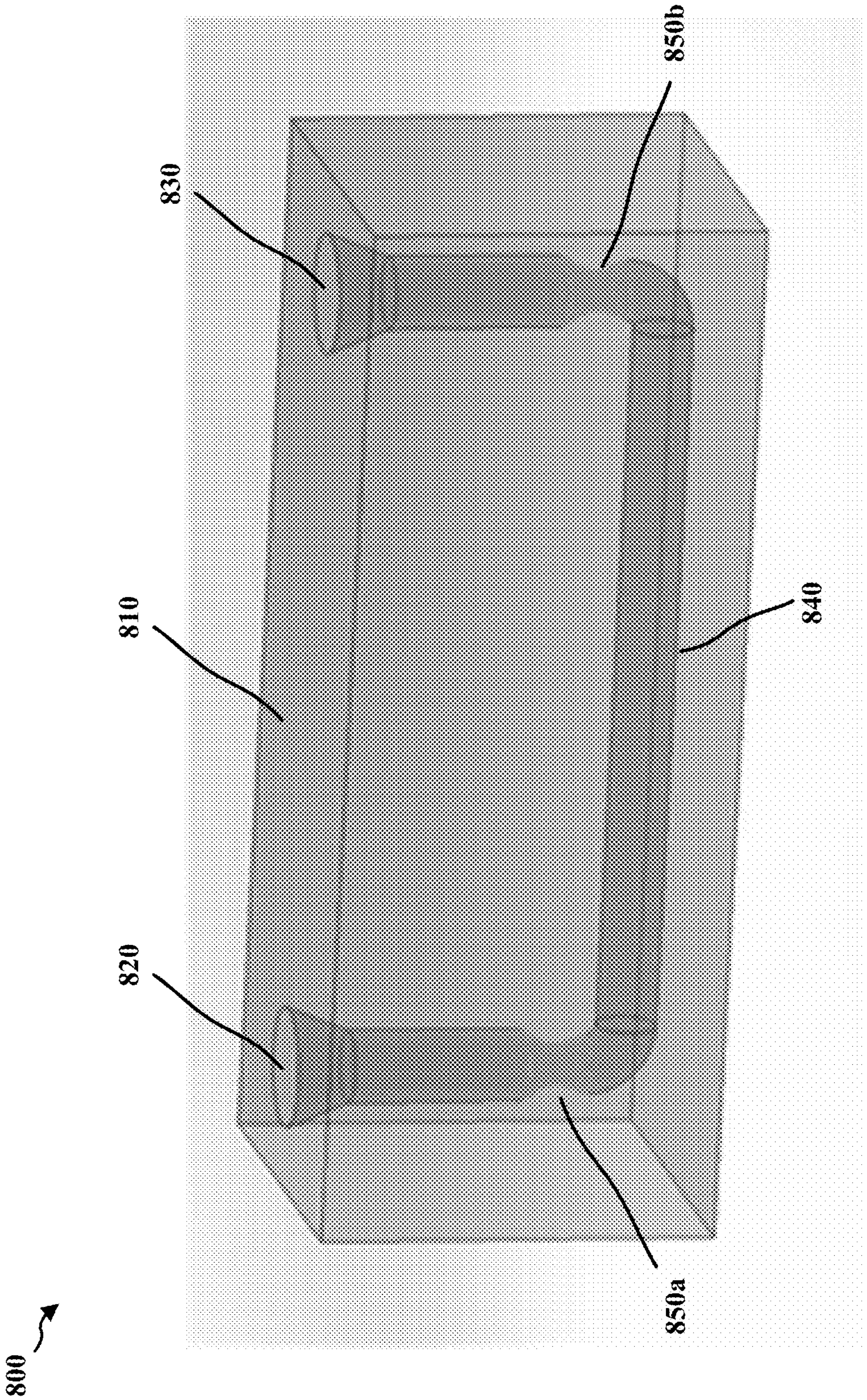
FIG. 8 is a schematic illustration of a bio-scaffold having a fluid channel with constrictions thereon for regulating the flow of fluids in the fluid channel, according to various embodiments.

In some embodiments, the one or more vascular components 590 may have constrictions thereon configured to regulate flow of fluids therein. FIG. 8 shows a schematic illustration of a bio-scaffold having a fluid channel with constrictions thereon for regulating the flow of fluids in the fluid channel, according to various embodiments. In some embodiments, the bio-scaffold 810 may have a bio-scaffold inlet 820, a bio-scaffold outlet 830 and a fluid channel 840 extending therebetween. In some instances, the fluid channel 840 may have one or more constrictions 850*a*, 850*b* that are configured to regulate the flow of fluids within the fluid channel 840. For example, the constrictions 850*a*, 850*b* may be configured to regulate the flow rate of the fluids in the fluid channel 840. In some instances, the constrictions 850*a* may be shaped and sized to regulate the flow rate, volume, etc., of fluids flowing into the bio-scaffold 810 via the bio-scaffold inlet 820 to be transported via the fluid channel 840 towards the bio-scaffold outlet 830. As another example, the constrictions 850*b* may be shaped and sized to regulate the flow rate, volume, etc., of fluids flowing within the fluid channel 840 out of the bio-scaffold 810 via the bio-scaffold outlet 830. In some cases, the constrictions 850*a*, 850*b* in the fluid channel 840 may have different shapes, sizes, etc., from each other (e.g., so that the flow rate, volumes, etc., of fluids flowing through the constrictions are equalized). In some cases, a bio-scaffold 810 may have multiple fluid channels 840 and the constrictions 850*a*, 850*b* in each fluid channel 840 may be configured (e.g., shaped and sized) to at least substantially equalize the fluid resistance or flow rate of fluids between the multiple fluid channels 840. In some cases, the constrictions 850*a*, 850*b* in the same fluid channel 840 may be configured to increase the speed or flow rate of the fluid flowing therein.

Returning to FIG. 5, in some instances, the one or more vascular components 590 of the bio-scaffold 570 may have wider cross-section within the interior of the bio-scaffold 570 in comparison to the cross-section of the bio-scaffold inlet 575*a* and/or the bio-scaffold outlet 575*b*. That is, for example, the cross-section of the one or more vascular components 590 may progressively narrow from the interior of the bio-scaffold 570 towards the bio-scaffold outlet 575*b*. As another example, starting at the bio-scaffold inlet 575*a*, the cross-section of the one or more vascular components 590 may progressively widen towards the interior of the bio-scaffold 590. In some instances, the one or more vascular components 590 in the interior of the bio-scaffold 570 may include a chamber or compartment in the bio-assembly 570 where fluids (e.g., a flowable suspension of cells) may be collected, within which biological studies may be conducted. For example, fluid injected into the bio-assembly 500 via the bio-assembly inlet 540 may enter the bio-scaffold 570 via the bio-scaffold inlet 575*a*. The fluid may then flow through the one or more vascular components 590 and be collected in chambers within for biological investigation therein. In some cases, the fluid may then be released out of the bio-assembly 500 via the bio-scaffold outlet 575*b* and the bio-assembly outlet 550*a*.

In some embodiments, the one or more vascular components 590 can have any shape in cross-section and a lateral dimension of (e.g., the cross-section lateral dimension is a radius or diameter if circular) ranging from about 10 μm to about 1 mm, about 100 μm to about 800 μm, about 200 μm to about 600 μm, about 300 μm to about 700 μm, about 400 μm to about 600 μm, about 450 μm to about 550 μm, including values and subranges therebetween. In some instances, the one or more vascular components 590 are perfusable. In some instances, the one or more vascular components 590 may change their shapes and sizes (e.g., expand, contract, etc.) in response to changes (e.g., increases or reductions) in pressure, mechanical, electrical, and/or chemical stimuli within the one or more vascular components 590.

Figure 9:
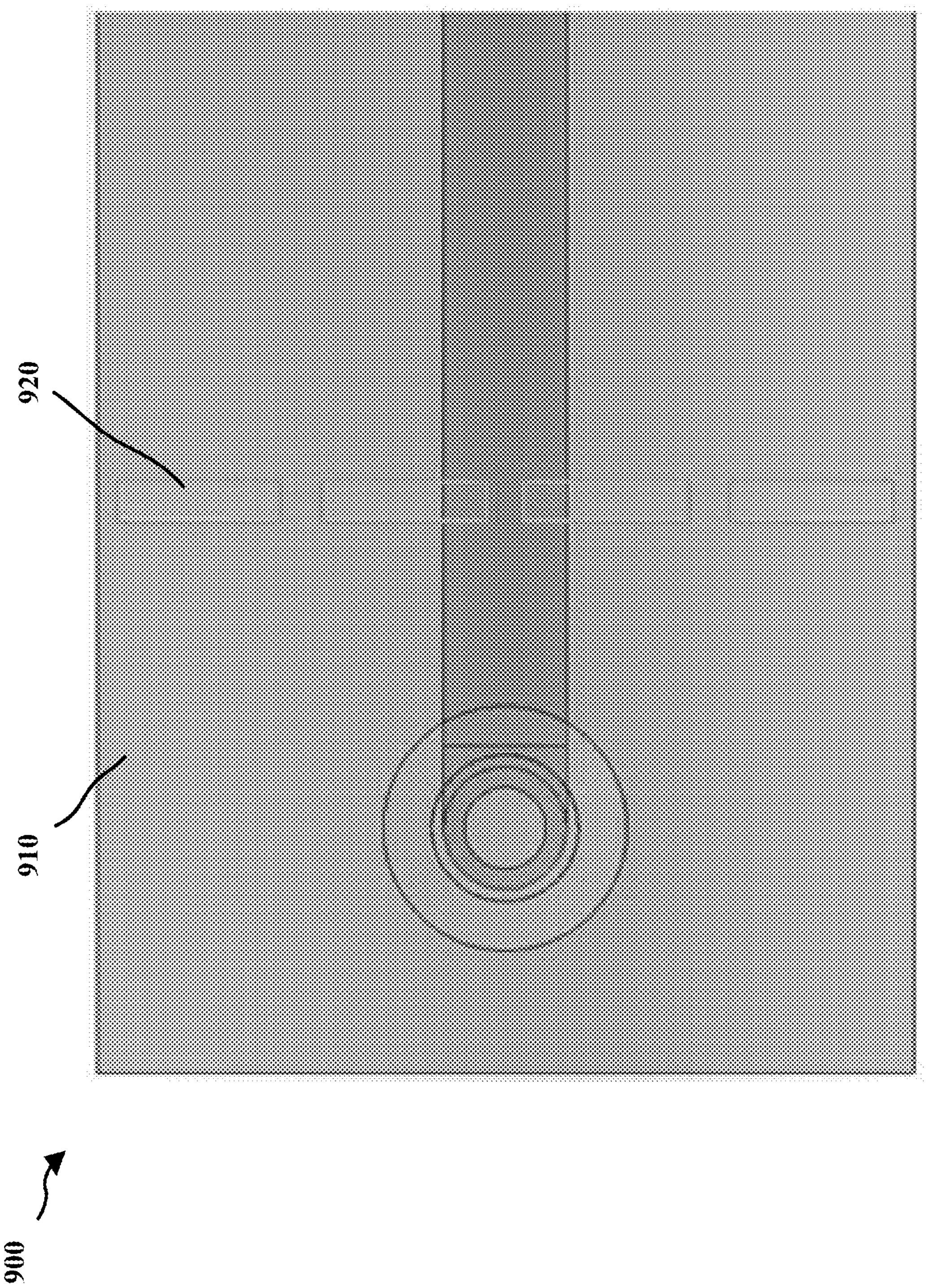
FIG. 9 is a schematic illustration of a bio-scaffold with sectioning labels indicated thereon for removing the bio-scaffold from a bio-assembly, according to various embodiments.

In some embodiments, the bio-scaffold 570 may have sectioning label thereon that is configured to facilitate the removal of the bio-scaffold 570 from the bio-assembly 500. FIG. 9 shows a schematic illustration of a portion of a bio-scaffold (e.g., such as 570 or 800) having a sectioning label or feature indicated thereon for removing the bio-scaffold from a bio-assembly (e.g., such as 500), according to various embodiments. In some embodiments, a bio-scaffold 910 of a bio-assembly may have a sectioning label 920 that is configured to allow one to sever the bio-scaffold 910 from other components (e.g., substrate) of the bio-assembly, and as such facilitate the removal of the bio-scaffold 910 from the bio-assembly. In some instances, the sectioning labels 920 may be disposed on (e.g., photocross-linked, covalently bound to, attached to, or placed adjacently without attachment to) the bio-scaffold 910 and may also serve as or include indicators that may indicate the presence of features configured to allow removal of the bio-scaffold 910 from the bio-assembly. Examples of such sectioning labels or features 920 include but are not limited to perforations, indentations, protrusion, etc. Such features may allow one to break off, disconnect, disengage, or otherwise separate the bio-scaffold from other components of the bio-assembly to which it is affixed, such as the substrate, the network of inlet and outlet fluid channels, etc., so that the bio-scaffold can be removed from the bio-assembly non-invasively.

As an example illustration, a bio-assembly having a bio-scaffold with a sectioning label as discussed above (e.g., a perforation, an indentation, a protrusion, etc.) may be used for a biological investigation and an investigator may wish to remove the bio-scaffold (with media, fluids, tissues, etc., contained therein) for further study/analysis. In such cases, the sectioning label or feature may serve as a label indicating to the investigator the location on the bio-scaffold where the investigator may separate the bio-scaffold from the bio-assembly, and components thereof, for removal from the bio-assembly. For instance, with reference to FIG. 5, the sectioning label on the bio-scaffold 570 may be configured to be visible from above the bio-assembly 500, and as such, the investigator can have convenient access to the bio-scaffold 570 via the top opening of the housing 560 (e.g., after removing the top cover of the bio-assembly that includes the lid 510 and the barrier 520). Further, the sectioning labels may facilitate the removal of the bio-scaffold 570 from the bio-assembly 500 because the sectioning labels or features, i.e., perforations, indentations, protrusions, etc., can make it easier to break off or otherwise disengage the bio-scaffold 570 from other components of the bio-assembly 500 to which it is connected and remove the bio-scaffold 570 from the bio-assembly 500.

In some embodiments, the bio-scaffold 570 can be removed from the bio-assembly 500 using a variety of methods. Examples of such bio-scaffold extractors include tools such as but not limited to optical tools, mechanical tools, chemical tools, etc. For example, an optical tool such as a laser may be used to direct light at the sectioning label of a bio-scaffold 570 to disengage the bio-scaffold 570 from other components (e.g., substrate) of the bio-assembly 500 to which it is connected for removal therefrom. For instance, the light may disconnect the bio-scaffold 570 at the sectioning label or feature and separate the bio-scaffold 570 from said other components. Other examples of bio-scaffold extractors that can be used to decouple the bio-scaffold 570 from the bio-assembly 500 at the sectioning label of the bio-scaffold 570 for removal from the bio-assembly 500 include chemicals such as bases (e.g., sodium hydroxide), acids (e.g., hydrochloric acid), proteinases (e.g., collagenase), or involvement of competitive chemical reactions (e.g., thioester exchange where an external chemical is introduced to compete with a chemical group/bond to cause dissociation) that is configured to break the bio-scaffold 570 at the sectioning label when applied thereon and decouple the bio-scaffold 570 from the bio-assembly 500. And yet other examples include a mechanical tool such as but not limited to a scooper that is also configured to separate the bio-scaffold from the bio-assembly 500 at the sectioning label when used to apply a force at the sectioning label. Additionally, the bio-scaffold can be removed by change in temperature if a thermo-responsive material, such as poly (N-isopropylacrylamide), pNIPAAm, is used to adhere the bio-scaffold to the bio-assembly.

In some embodiments, the substrate 580 of the bio-assembly 500 can be a transparent substrate. In some instances, the substrate 580 can be a glass substrate, a plastic substrate, and/or a substrate that includes suitable materials such as but not limited to polycarbonate, polysulfone, polymethyl methacrylate, polystyrene, cyclic olefin copolymer, polyethylene, polypropylene, glass, quartz, mica, infrared-transparent salts, such as calcium bromide, potassium bromide, or any of these materials combined with a thin film of any other material, or with a thin metallic film to enable surface plasmon based measurements, or combinations thereof.

In some instance, the substrate 580 may be configured to mate with the bottom edges of the housing 560 such that when the substrate 580, with the bio-scaffold 570 attached thereon, contacts the housing 560, the edges of the substrate 580 may attach to the bottom edges of the housing 560 and form a seal that can be air-tight, water/fluid-tight, dust-tight, etc. In some cases, the attachment may be facilitated via an adhesive such as but not limited to tapes, liquid adhesives/glues, UV curable materials or resin, cyanoacrylate adhesive, plasma bonding, etc.

Figure 10A:
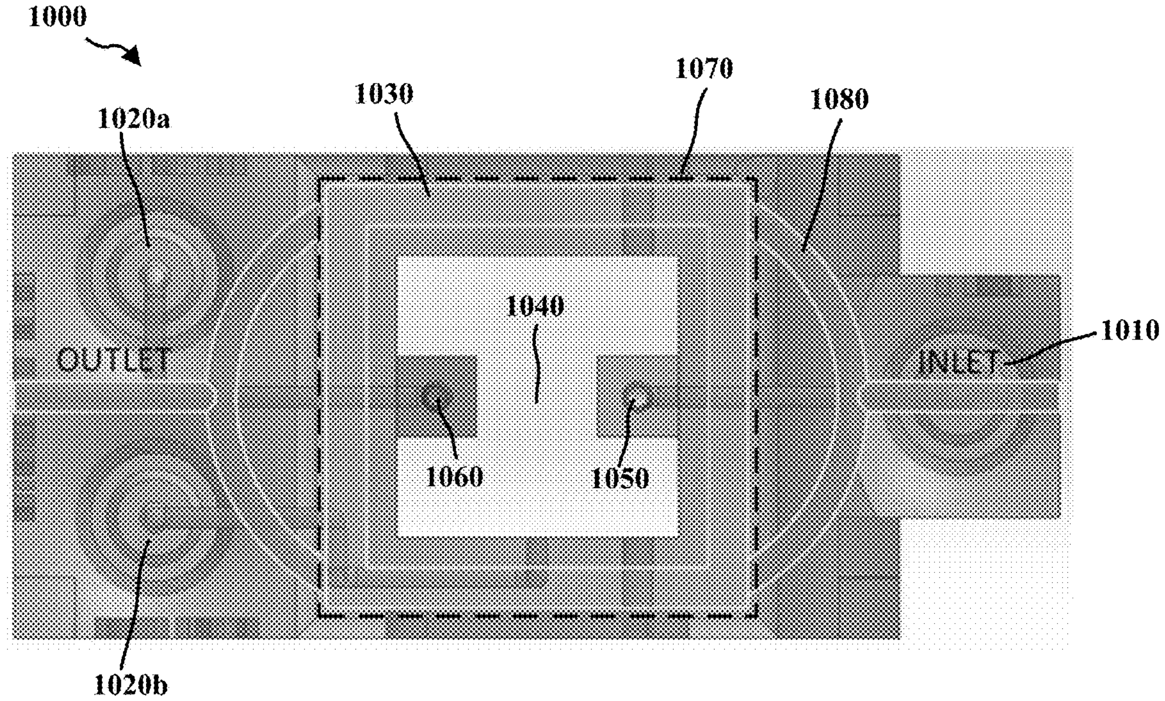
FIGS. 10A and 10B show schematic illustrations of a bottom view of a partition of a manifold having a liquid adhesive interface/delivery architecture and a fluid delivery architecture for delivering fluids to a bio-scaffold contained within the partition, respectively, according to various embodiments.
Figure 10B:
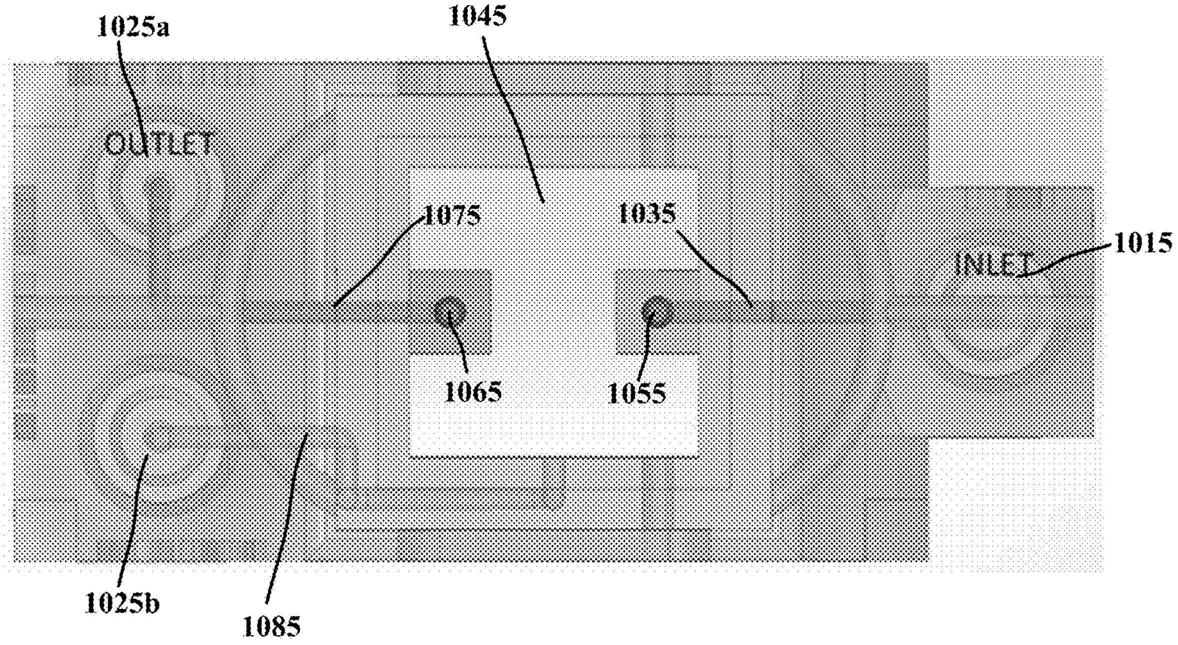

In some embodiments, a partition of a manifold (e.g., partition 305 in FIG. 3) that is configured to receive a bio-assembly (e.g., 500) may include an interface positioned within the manifold and/or at its bottom edges or surface. In some instances, the interface may be an adhesive interface configured to interface with, and apply an adhesive to, the substrate of the bio-assembly when the bio-assembly is positioned in the partition to attach the substrate of the bio-assembly to the partition. FIG. 10A shows schematic illustration of a bottom view of a partition of a manifold configured to receive a bio-assembly and having an adhesive delivery architecture, according to various embodiments. In some embodiments, a partition of a manifold is configured to receive a bio-assembly 1000 having a bio-scaffold 1040, a bio-assembly inlet 1010 in fluid communication with a bio-scaffold inlet 1050 of the bio-scaffold 1040, and/or one or more bio-assembly outlets 1020*a*, 1020*b* in fluid communication with a bio-scaffold outlet 1060 of the bio-scaffold 1040. As shown in FIG. 10B, in some instances, fluid flowing into the bio-assembly 1000 via the bio-assembly inlet 1015 arrives at the bio-scaffold inlet 1055 via the inlet fluid channel 1035, through which the fluid enters the bio-scaffold (e.g., for biological investigations). Fluid resulting from the biological investigations may then be released from the bio-scaffold via the bio-scaffold outlet 1065 that is in fluid communication with the bio-assembly outlet 1025*a* via the outlet fluid channel 1075, and the resulting fluid may flow through the outlet fluid channel 1075 to exit the bio-assembly 1000 through the bio-assembly outlet 1025*a*. In some instances, the bio-assembly outlet 1025*b* may be in fluid communication with bio-scaffold access channel 1085, which is similar to the bio-scaffold access channel 650 of FIG. 6 (e.g., and as such the discussion above about the bio-scaffold access channel 650 equally applies to bio-scaffold access channel 1085).

In some instances, the bio-assembly 1000 may also include a substrate 1070. In some cases, the partition in which the bio-assembly 1000 is positioned may have the interface 1030 at its bottom edges or surface, and the interface 1030 may be configured to apply adhesive to the substrate when the bio-assembly 1000 that includes the substrate 1070 is positioned in and contacts the partition. In some embodiments, the interface 1030 can be an indentation or a moat in the partition that is configured to receive adhesive (e.g., liquid adhesive) from an adhesive delivery architecture 1080 of the manifold. That is, a manifold having partitions may have an adhesive delivery architecture 1080 that is configured to deliver liquid adhesives to the interfaces 1030 of partitions so that when a bio-assembly 1000 with a substrate 1070 is positioned within a partition, the interface 1030 affixes the substrate 1070 (and as such that bio-assembly 1000) to the partition. For instance, the liquid adhesive, once delivered to the interface 1030, may be cured in place and as such affix or bond the substrate 1070 to the partition (i.e., to the manifold). Examples of adhesives that can be delivered to the interface 1030 by the adhesive delivery architecture 1080 include but are not limited to ultra-violet or visible light curable resin, air, cyanoacrylate adhesive, silicone gasket, polycarboxylate cements, nitrocellulose, or any combination thereof. In some embodiments, the interface 1030 may also be configured to serve as a buffer region to collect leaks in the bio-assembly. That is, for instance, the interface 1030 can be a moat configured to capture fluids leaking out of the bio-scaffold 1040 and/or the network of inlet or outlet fluid channels connected thereto.

Returning now to FIG. 5, in some embodiments, the bio-assembly 500 that is configured for placing or positioning in a partition of a manifold (e.g., partition 230 of manifold 200 or partition 235 of manifold 255 in FIG. 2) may be formed using an additive manufacturing technique (referred herein also as “3D printing” techniques) such as but not limited to injection molding techniques, rapid casting, sacrificial molding, and/or the like. In some embodiments, to produce the bio-assembly 500, the substrate 580 (e.g., a transparent glass) may be placed on an additive manufacturing machine (i.e., a “3D printer”), where the substrate 580 can be associated with a single bio-assembly 500 (e.g., and as such with a single partition that is configured to receive the bio-assembly 500) or the substrate can be associated with multiple bio-assemblies each configured to be received or positioned in a respective partition. That is, in some cases, the substrate 580 may serve as a substrate to only a single bio-assembly 500. In other cases, the substrate 580 may serve as a substrate for multiple bio-assemblies of a manifold. For example, with reference to FIG. 2A, in the former case (i.e., the substrate being associated with a single partition), each bio-assembly that is configured to be positioned in a partition 230 may have its own substrate (e.g., which is not shared with other bio-assemblies configured to be positioned in the other partitions of the manifold 200). In the latter case, however, multiple bio-assemblies configured to be positioned in multiple respective partitions 230 of the manifold 200 may share the same substrate. For instance, there may be a single substrate for the 12 bio-assemblies configured to be positioned in the respective 12 partitions 230 of the manifold 230. In either case, the discussion herein with respect to the additive manufacturing or 3D printing of bio-assemblies applies equally to both bio-assemblies having their own substrates and bio-assemblies sharing one or more substrates among themselves.

In some embodiments, the substrate 580 may be chemically functionalize by submerging the clean substrate 580 into a desired chemical or vapor deposition. For example, in some instances, a heterobifunctional chemical crosslinker that has two different reactive functional groups may be used to chemically functionalize the substrate 580, where a first functional group of the heterobifunctional chemical crosslinker is configured to bond to the substrate and a second functional group of the heterobifunctional chemical crosslinker is configured to provide attachment when the bio-scaffold (e.g., or a hydrogel precursor thereof) contacts the substrate 580. For example, the first functional group and the second functional group may include a trichlorosilane and a methacrylate, respectively, where the former may be configured to bond to the substrate and the latter may be configured to bond to the bio-scaffold. Other examples of heterobifunctional chemical crosslinkers include but are not limited to 3-(trimethoxysilyl) propyl methacrylate, 3-(Trimethoxysilyl)propyl acrylate, allyltrimethoxysilane, 3-(Trimethoxysilyl)-1-propanethiol, (3-Mercaptopropyl) trimethoxysilane, (3-Aminopropyl)trimethoxysilane, and/or the like.

In some instances, after the chemical functionalization of the substrate 580 with the heterobifunctional chemical crosslinker, a polymerizable hydrogel precursor may be placed in contact with the second functional group of the heterobifunctional chemical crosslinker (e.g., methacrylate) that is configured to provide adhesion to the bio-scaffold 570. The polymerizable hydrogel precursor may then be polymerized (e.g., photopolymerized using visible or UV light) to initiate a polymerization reaction in the polymerizable hydrogel precursor that results in the formation of a hydrogel disposed on the substrate 580. In some instances, an additive manufacturing or 3D printing technique may then be applied to the hydrogel to form the bio-scaffold 570. In some instances, the hydrogel may be disposed on the substrate in that the hydrogel may be photocrosslinked to, covalently bound to, attached to, or placed adjacently without attachment to, the substrate 580.

In some instances, the additive manufacturing of the hydrogel to form the bio-scaffold 570 includes 3D printing the hydrogel to generate a bio-scaffold 570 that has a bio-scaffold inlet 575*a*, a bio-scaffold outlet 575*b*, and a bio-scaffold fluid channel or vascular component 590 extending therebetween. For example, the 3D printing of the hydrogel may produce a bio-scaffold 570 that is at least substantially the same as the bio-scaffold 800 shown in FIG. 8. For instance, the hydrogel may be 3D printed so that the bio-scaffold fluid channel or vascular component 590 of the printed bio-scaffold 570 may include one or more constrictions configured to regulate the flow of fluids or perfusates therein. Further, the 3D printing of the hydrogel may also equip the printed bio-scaffold 570 with a sectioning label or feature (e.g., a perforation, an indentation, a protrusion, etc.) configured to facilitate the removal of the bio-scaffold 570 from the bio-assembly in which it is located.

In some embodiments, upon the formation of the bio-scaffold 570, the housing 560 including the bio-assembly inlet 540 and the bio-assembly outlets 550*a*, 550*b* may also be additively manufactured using 3D moldable materials. For example, the housing 560 may be 3D printed using plastics, resin (e.g., biocompatible), polycarbonate, acrylic, glass, and/or the like. In some instances, the 3D printing of the housing 560 may also include the 3D printing of the network of inlet fluid channels and the network of outlet fluid channels of the bio-assembly 500 such that the former are in fluid communication with both the bio-assembly inlet 540 and the bio-scaffold inlet 575*a*, and the latter are in fluid communication with both the bio-assembly outlet 550*a* and the bio-scaffold outlet 575*b*. Further, the 3D printing of the housing may also include the 3D printing of a bio-scaffold access channel (e.g., similar to bio-scaffold access channel 650 in FIG. 6) that may be coupled to or configured to be in fluid communication with the interior of the bio-assembly 500 or the housing 560, including the networks of bio-assembly inlet and outlet fluid channels, and/or the bio-scaffold 570 positioned within the housing 560.

In some instances, the 3D printing of the housing 560 may include the mating of the housing 560 with the substrate 580 (e.g., with the 3D printed bio-scaffold affixed thereon) such that the network of inlet fluid channels of the bio-assembly couple to the bio-scaffold inlet 575*a*, and the network of outlet fluid channels of the bio-assembly couple to the bio-scaffold outlet 575*b*. In some cases, when the housing 560 mates with the substrate 580, an adhesive may be provided in between the housing 560 and the substrate 580 via an adhesive delivery architecture (e.g., the adhesive delivery architecture 1080 in FIG. 10) such that the housing 560 and the substrate 580 attach and form an air-tight, water/fluid-tight, dust-tight, etc., seal between the housing 560 and the substrate 580.

In some of the embodiments, the 3D printing of the housing 560 can occur after the bio-scaffold 570 is affixed to the substrate 580. These embodiments, however, are non-limiting and that when forming the bio-assembly 500, the various components of the bio-assembly 500 can be produced or formed in any order. For example, instead of affixing the bio-scaffold 570 to the substrate 580 first and then 3D printing the housing 560, in some embodiments, the housing 560 may be 3D printed and then mated to the substrate 580 (e.g., without the bio-scaffold 570 affixed thereon a priori) as discussed above. In such cases, once the 3D printed housing 560 is mated with and adhered to the substrate 580, the bio-scaffold 570 may then be formed using computed axial lithography (CAL) techniques. For example, the substrate 580 may be chemically functionalized with a heterobifunctional chemical crosslinker and a polymerizable hydrogel precursor may be placed in contact with a functional group of the heterobifunctional chemical crosslinker, as discussed above. Then, the CAL techniques, including projecting a series of 2D cross-sectional images of the bio-scaffold onto the hydrogel precursor, may be applied non-invasively to the hydrogel precursor to form the bio-scaffold 570 from the hydrogel precursor.

In some embodiments, the lid 510 and the seal 530 may also be additively manufactured. In some instances, the seal 530, which can be a double-sided adhesive seal, may be adhered to both the top surface of the housing 560 and the bottom surface of the barrier 520, and the lid 510 may be affixed to the top surface of the barrier 520, resulting in a combined lid-barrier-seal component that can serve as a top air-tight, water/fluid-tight, dust-tight cover for the bio-assembly 500.

In some embodiments, multiple bio-assemblies 500 3D additively manufactured as discussed above may be received into or positioned within respective partitions of a plate of manifold (e.g., partition 230 of manifold 200) so as to produce a manifold (e.g., such as manifold 300) with a manifold inlet and a manifold outlet in respective fluid communication (e.g., via a network of internal vasculatures or inlet/outlet fluid channels) with the inlets and outlets of the bio-assemblies 500 (e.g., as discussed above with reference to FIG. 3). Such manifolds, including the bio-scaffolds contained within, can provide cellular environments that mimic human/animal anatomy and physiology and as such can be used as biomimetic human/animal tissue models for conducting biological investigations, as discussed in Applicant's Application No. 63/020,407, filed May 5, 2020, titled "Microcosm Bio-Scaffold and Applications Thereof," the disclosure of which is incorporated herein by reference in its entirety.

Figure 11:
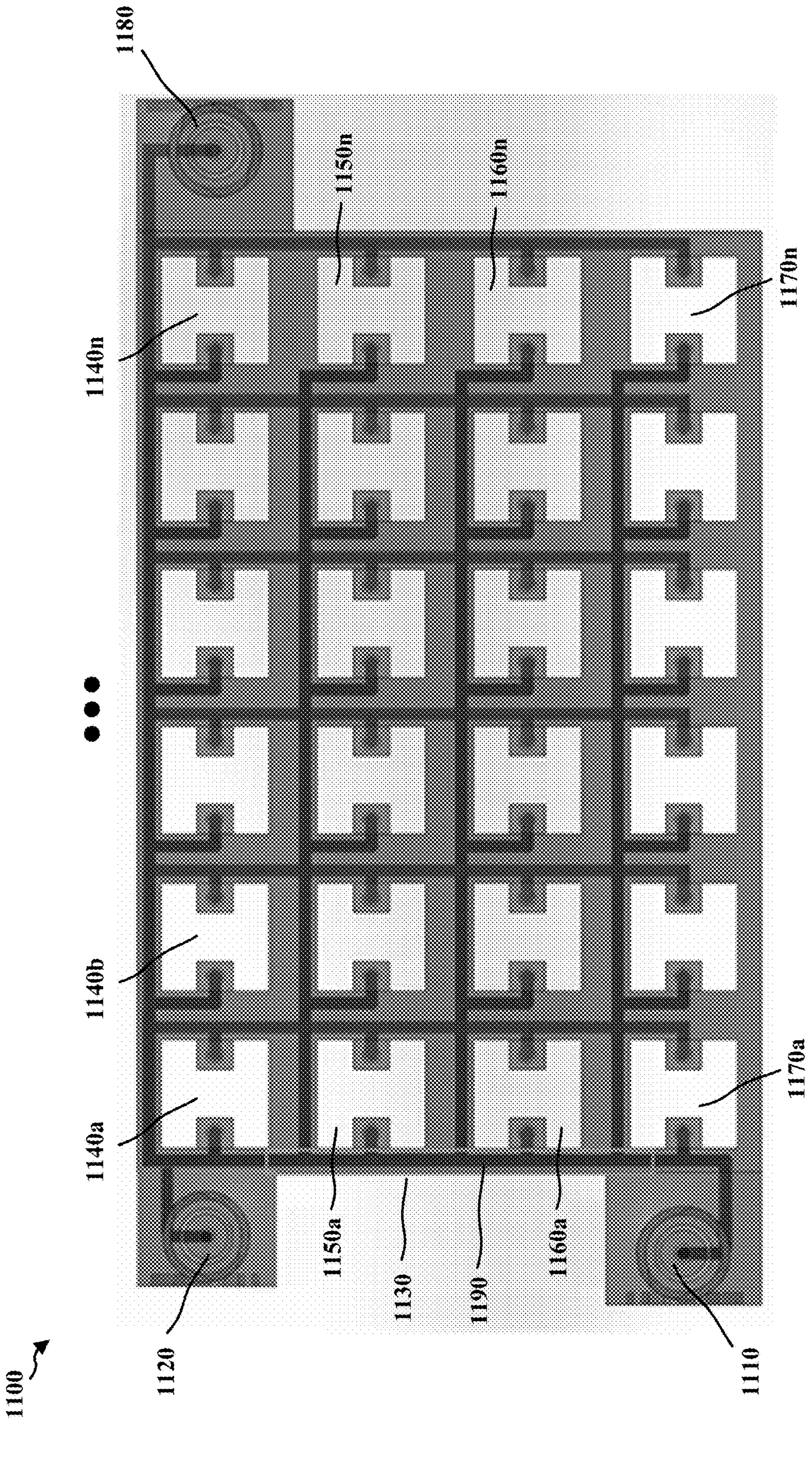
FIG. 11 is a schematic illustration of a manifold having multiple manifold inlets and a mixing region for mixings fluids received into the manifold via the multiple manifold inlets, according to various embodiments.

In some embodiments, the plates of the manifolds may have more than one manifold inlets and/or more than one manifold outlets, and the former may be in fluid communication (e.g., via a network of internal inlet vasculatures or inlet fluid channels) with the bio-assembly inlets of the bio-assemblies contained within the partitions of the plate and the latter may be in fluid communication (e.g., via a network of internal outlet vasculatures or outlet fluid channels) with the bio-assembly outlets of the bio-assemblies. Such manifolds can provide cellular environments that are particularly suitable for conducting drug safety and efficacy studies, where cell culture media or perfusates and different amounts or doses of candidate drug fluids may be directed to, using the multiple manifold inlets, to different bio-scaffolds/bio-assemblies of a microfluidic manifold in a controlled manner. FIG. 11 shows a schematic illustration of a manifold having multiple manifold inlets and a mixing region for mixing fluids received into the manifold via the multiple manifold inlets, according to various embodiments.

In some embodiments, the manifold 1100 may include two manifold inlets 1110, 1120 and a single manifold outlet 1180. It is to be understood that FIG. 11 is a non-limiting illustrative example and that the manifold 1100 can have any multiple number of manifold inlets (e.g., 3, 4, 5, etc.) and any number of manifold outlets (e.g., 2, 3, 4, 5, etc.), and the discussion herein related to the two manifold inlets 1110, 1120 and the single manifold outlet 1180 equally applies to any multiple number of manifold inlets and any number of manifold outlets. In some instances, the manifold 1100 may also include multiple bio-assemblies **1140*a*-1140*n*, 1150*a*-1150*n*, 1160*a*-1160*n*, 1170*a*-1170*n*, each received in or positioned within a respective partition of the manifold 1100. In some cases, the bio-assembly inlet of each of the multiple bio-assemblies 1140*a*-1140*n*, 1150*a*-1150*n*, 1160*a*-1160*n*, 1170*a*-1170*n* may be in fluid communication with both manifold inlets 1110, 1120. Further, the bio-assembly outlet of each of the multiple bio-assemblies 1140*a*-1140*n*, 1150*a*-1150*n*, 1160*a*-1160*n*, 1170*a*-1170*n* may be in fluid communication with the manifold outlet 1180. Although FIG. 11 shows a regular rectangular arrangement of partitions each containing a bio-assembly, it is to be understood that the manifold 1100** can have any internal microfluid architecture provided the bio-assemblies are in fluid communication with the manifold inlets and outlets.

In some embodiments, the microfluidic architecture of the manifold 1100 including the partition arrangement and the number of manifold inlets may be configured to facilitate the controlled distribution of fluids (e.g., cell culture media, drugs, etc.) throughout the bio-assemblies **1140*a*-1140*n*, 1150*a*-1150*n*, 1160*a*-1160*n*, 1170*a*-1170*n* of the manifold 1100. For example, FIG. 11 shows a rectangular arrangement of 24 bio-assemblies arranged in four rows and six columns, where bio-assemblies in the rows are in series fluid communication with each other and the bio-assemblies in a column are in parallel fluid communication with each other. In such cases, same or different fluids may be injected via the two manifold inlets 1110, 1120 into the manifold 1100 to attain a desired gradient of the same or different fluids concentrations across rows and/or columns of the bio-assemblies (e.g., all bio-assemblies in the same column may have same fluid concentration of a fluid injected via one of the inlets while different columns may have different fluid concentrations). That is, the microfluidic arrangement of the bio-assemblies and/or the number of manifold inlets may be such that a desired distribution or gradient of concentration of one or both fluids injected into the manifold 1100 may be achieved at some or all of the bio-assemblies in the manifold 1100. It is to be understood that the above example is a non-limiting illustrative example and that manifold 1100 can have any number of manifold inlets, and also that the bio-assemblies may be arranged in any manner (e.g., in series fluid communication, in parallel fluid communication, or combination thereof) that allow for a desired differential distribution of the concentration of the fluids injected into the manifold 1100**. In some instances, fluid concentration may refer to concentration of species that are present in the fluids, examples of which include solutes, solvents, and/or the like.

In some cases, the concentrations of the fluids in the bio-assemblies, and as such the distribution or gradient of the fluids concentrations across the manifold 1100, may be varied or controlled by varying the flow rates with which same or different fluids are injected into the manifold 1100 via the two manifold inlets 1110, 1120. For example, a first flow rate of the first fluid injected via the first manifold inlet 1110 and a second flow rate of the second fluid injected via the second manifold inlet 1120 may be selected to achieve a desired distribution of first fluid-to-second fluid proportion in the bio-assemblies **1140*a*-1140*n*, 1150*a*-1150*n*, 1160*a*-1160*n*, 1170*a*-1170*n* of the manifold 1100. For instance, the first flow rate and/or the second flow rate may be selected such that the ratio of the first fluid to the second fluid in the fluids arriving at the first row of bio-assemblies 1140*a*-1140*n* may be a first proportion (e.g., 1:1000), while in the second row of bio-assemblies 1150*a*-1150*n* the ratio can be a second proportion (e.g., 1:100) different from the first proportion, etc. It is to be understood that the above example is a non-limiting illustrative example and that the flow rates of the injected fluids may be varied to control and achieve any desired distribution of fluid concentrations or proportions of the fluids arriving at the bio-assemblies of the manifold 1100**.

In some embodiments, the first flow rate and/or the second flow rate may be selected or determined based on the fluidic properties of the first fluid and/or the second, such as but not limited to temperature, viscosity, concentration (e.g., of solutes, solvents, etc., in the injected fluids), etc. In some instances, as noted above, there may be one or more fluid pumps coupled to or in fluid communication with the manifold inlets of the manifold 1100 and the one or more fluid pumps may be controlled to provide a desired flow rate of the fluids being injected into the manifold 1100 based on the afore-mentioned fluidic properties of the fluids. For instance, if the first fluid has a very high concentration of first solutes and the second fluid has a very low concentration of second solutes, the flow rate of the first fluid and the flow rate of the second fluid may be selected based on the relative concentration of solutes in the first and second fluids. It is to be understood that the above example is a non-limiting illustrative example and that the flow rates of the injected fluids may also be varied based on the temperature, viscosity, etc., of the fluids to control and achieve any desired differential distribution of fluids concentrations across the bio-assemblies of the manifold 1100.

For example, in some instances, a heater (e.g., such as a silicone heater) may be included in the manifold 1100 to regulate the temperature of the injected fluids, which may in turn affect the release of factors. For example, a thick silicone heater may be placed at the manifold inlets, manifold outlets, fluid channels, etc., of the manifold 1100 to cause localized heating of membranes, valves, fluids, etc., located therein so as to release factors into the manifold 1100 (e.g., from the membranes, valves, fluids, etc.).

In some embodiments, the fluids injected via the multiple manifold inlets may be mixed via a mixer positioned upstream from the bio-assemblies 1140*a*-1140*n*, 1150*a*-1150*n*, 1160*a*-1160*n*, 1170*a*-1170*n*. For example, the mixer may be positioned at a common fluid channel that is upstream from the bio-assemblies 1140*a*-1140*n*, 1150*a*-1150*n*, 1160*a*-1160*n*, 1170*a*-1170*n* and in fluid communication with the multiple manifold inlets. In some instances, such a mixer may be configured to efficiently mix the fluids over the axial length of the common fluid channel in which it is positioned or located. For example, with reference to FIG. 11, the mixer may be located in the common fluid channel 1190 that is upstream from the bio-assemblies 1140*a*-1140*n*, 1150*a*-1150*n*, 1160*a*-1160*n*, 1170*a*-1170*n* and may mix the fluids injected via the two manifold inlets 1110, 1120 in the mixing region 1130 of the common fluid channel 1190, after which the mixed fluid may then be distributed to the multiple bio-assemblies via the networks of inlet fluid channels of the manifold 1100. In some instances, the mixer may have a moving part. An example of a mixer includes but is not limited to a static mixer, a magnetic particle mixer, an acoustofluidic mixer, an electrophoretic mixer, and/or the like. For instance, a static mixer can be a mixer having no moving parts. That is, in some cases, the mixer may not have a moving part. And in some cases, a mixer may have moving parts. In some instances, static mixers may be configured to mix fluids flowing through the mixers, examples of which include but are not limited to antiparallel fins, helices, fixed surface shapes or topologies configured to disrupt streamlined fluid flow, etc.

As an illustrative non-limiting example of the use of the manifold 1100 for a biological investigation of a candidate drug, in some embodiments, the second manifold inlet 1120 may be in fluid communication with a drug reservoir and as such may be configured to receive a candidate drug from the reservoir into the manifold 1100, examples of which including but not limited to chemotherapy drugs, antibiotics (e.g., doxycycline, etc.), and/or the like. Further, the first manifold inlet 1110 may be in fluid communication with a cell culture media reservoir and as such may be configured to receive cell culture media from the reservoir into the manifold 1100, examples of which include but are not limited to tissue or cell perfusates, serums, etc. The biological investigation may include studies directed at determining the behavior of the cells that are exposed to the candidate drug (e.g., different doses of the candidate drug). For example, different doses of the candidate drug may be combined with the cell culture media and perfused into the bio-scaffold (e.g., hydrogel) to investigate the behavior of the cells as the cells are exposed to the candidate drugs in the bio-scaffold. As such, a manifold 1100 that is configured to allow different doses of a candidate drug combine with a cell culture media can be used to conduct such investigations.

In some embodiments, the manifold 1100 can provide a mechanism for such biological investigations where multiple samples of the cell culture media are exposed to the different doses of the candidate drugs in a controlled manner in the bio-scaffolds of the bio-assemblies of the manifold 1100. For example, the manifold may have at least as many partitions (i.e., as many bio-assemblies or bio-scaffolds) as the number of candidate drug dosage amounts to be studied, and the biological investigation may include differentially distributing different amounts or proportions of cell culture media and candidate drug perfusates to the multiple bio-assemblies 1140*a*-1140*n*, 1150*a*-1150*n*, 1160*a*-1160*n*, 1170*a*-1170*n* contained within the multiple partitions of the manifold 1100, where the different amounts or proportions of cell culture media and candidate drug perfusates correspond to the candidate drug dosage amounts that are to be studied. In other words, the manifold 1100 may be used to mix the cell culture media and candidate drug perfusates and deliver mixed fluids having different cell culture media-to-drug proportions or concentrations to the multiple bio-assemblies or bio-scaffolds for performing a biological investigation to determine the effects, on the cell culture samples, of drug dosages corresponding to the different cell culture media-to-drug proportions/concentrations.

In some embodiments, using one or more fluid pumps in fluid communication with the drug reservoir and the cell culture media reservoir, the candidate drug and the cell culture media perfusates may be fed into the manifold 1100 via the second manifold inlet 1120 and the first manifold inlet 1100, respectively. In some instances, the flow rate of the candidate drug and the flow rate of the cell culture media may be determined or selected based on the fluidic properties of the candidate drug and the cell culture media perfusates, and/or the microfluidic architecture or bio-assembly arrangement of the manifold 1100 so as to obtain the desired cell culture media-to-drug proportions or concentrations in the multiple bio-assemblies or bio-scaffolds of the manifold 1100.

For example, with respect to FIG. 11, as noted above, the microfluidic architecture or bio-assembly arrangement of the manifold 1100 includes a grid of bio-assemblies 1140*a*-1140*n*, 1150*a*-1150*n*, 1160*a*-1160*n*, 1170*a*-1170*n* arranged in rows and columns, where bio-assemblies in the rows are in series fluid communication with each other and the bio-assemblies in a column are in parallel fluid communication with each other. In such cases, when conducting the biological investigation for candidate drug efficacy, an investigator may wish, as a non-limiting illustrative example, the different rows of multiple bio-assemblies to have different cell culture media-to-drug proportions or concentrations. The investigator may then determine or select flow rates for the candidate drug and cell culture media perfusates, provided the fluidic properties (e.g., temperature, viscosity, concentration of solutes, etc.) of the cell culture media and/or the candidate drug and the grid microfluidic architecture of the bio-assemblies, to achieve different cell culture media-to-drug proportions or concentrations in the different rows of the multiple bio-assemblies or bio-scaffolds of the manifold 1100. For example, the candidate drug and cell culture media perfusates may be injected into the manifold with flow rates such that the combined candidate and cell culture media perfusate along the common fluid channel 1190 may have a different cell culture media-to-drug proportions or concentrations along the axial length of the common fluid channel 1190, corresponding to the different rows of the multiple bio-assemblies of the manifold 1100. In some instances, the flow rates for the candidate drug and/or cell culture media perfusates may be determined or calculated based on the type of mixer used to mix the candidate drug and cell culture media perfusates, the concentrations and/or molecular weights of the candidate drug and/or cell culture media perfusates, etc.

For example, the combined fluid may have different cell culture media-to-drug proportions or concentrations in the portions of the common fluid channel 1190 that are adjacent to the different rows of bio-assemblies 1140*a*-1140*n*, 1150*a*-1150*n*, 1160*a*-1160*n*, 1170*a*-1170*n*. That is, for instance, the portion of the combined candidate and cell culture media perfusate that is adjacent to the row of bio-assemblies 1140*a*-1140*n* and configured to flow therein may be different from the portion of the combined candidate and cell culture media perfusate that is adjacent to any other row of bio-assemblies (e.g., 1150*a*-1150*n*) and configured to flow therein. It is to be understood that determining or selecting flow rates to achieve different cell culture media-to-drug proportions or concentrations in the different rows of the multiple bio-assemblies or bio-scaffolds is a non-limiting illustrative example, and that flow rates of injected fluids may be determined or selected to have any desired differential distribution of cell culture media-to-drug proportions or concentrations across the multiple bio-assemblies or bio-scaffolds of the manifold 1100.

In some embodiments, the combined candidate drug and cell culture media perfusate in the common fluid channel 1190 may then be mixed into a mixture via the aforementioned mixers. For example, a mixer positioned in the common fluid channel 1190 upstream from the bio-assemblies 1140*a*-1140*n*, 1150*a*-1150*n*, 1160*a*-1160*n*, 1170*a*-1170*n* may mix, in the mixing region 1130, the candidate drug and cell culture media perfusates that are injected into the manifold 1100 via the manifold inlets 1110, 1120, and combined in the common fluid channel 1190 into the combined candidate and cell culture media perfusate. In some instances, the mixing of the combined candidate drug and cell culture media perfusate may not substantially change the cell culture media-to-drug proportion or concentration thereof. As such, after the mixing, the mixed fluid in the common fluid channel 1190 adjacent to the different rows of bio-assemblies 1140*a*-1140*n*, 1150*a*-1150*n*, 1160*a*-1160*n*, 1170*a*-1170*n* may have different cell culture media-to-drug proportions or concentrations, and may flow into the different rows of bio-assemblies, resulting in the bio-scaffolds of the bio-assemblies 1140*a*-1140*n*, 1150*a*-1150*n*, 1160*a*-1160*n*, 1170*a*-1170*n* in different rows receiving fluids having different cell culture media-to-drug proportion or concentration (e.g., and bio-assemblies in the same row receiving fluids having at least substantially similar cell culture media-to-drug proportion or concentration). In some embodiments, after the biological investigation for the candidate drug efficiency is carried out in the bio-scaffolds of the bio-assemblies 1140*a*-1140*n*, 1150*a*-1150*n*, 1160*a*-1160*n*, 1170*a*-1170*n* of the manifold 1100, the resulting fluids may be released out of the manifold 1100 and into an outlet reservoir via the network of internal outlet vasculatures or outlet fluid channels of the manifold 1100 and the manifold outlet 1180.

In some embodiments, the resulting fluids collected into the outlet reservoir may be in communication with another manifold (e.g., similar to manifold 1100) such that the resulting fluids may be further investigated on another type of cell culture media (i.e., cells). For example, after a first cell culture media (i.e., cells) is combined with different doses of a first compound (e.g., first candidate drug) in a bio-scaffold of a first manifold for investigation of the behavior of the first cells as the first cells are exposed to the different doses of the first compound, the resulting fluids discharged into the outlet reservoir may to directed to a second manifold for investigation of the behavior of second cell culture media when the second cell culture media is combined with the resulting fluids in a bio-scaffold of the second manifold. For instance, in a human-on-a-chip set-up, the first cells can be liver cells or tissues, and the liver cells or tissues may be combined with different doses of a first drug in a bio-scaffold of a first manifold to investigate the metabolization of the different doses of the first drug by the liver cells or tissues. In such cases, the resulting fluids or byproducts discharged into the outlet reservoir may be directed to a second manifold where the resulting fluids may be combined with different types of cells/tissues (e.g., kidney tissues) to investigate the behavior of the kidney tissues as the kidney tissues are exposed to the resulting fluids (i.e., to investigate the more holistic response of a human body to the candidate drugs).

Figure 12:
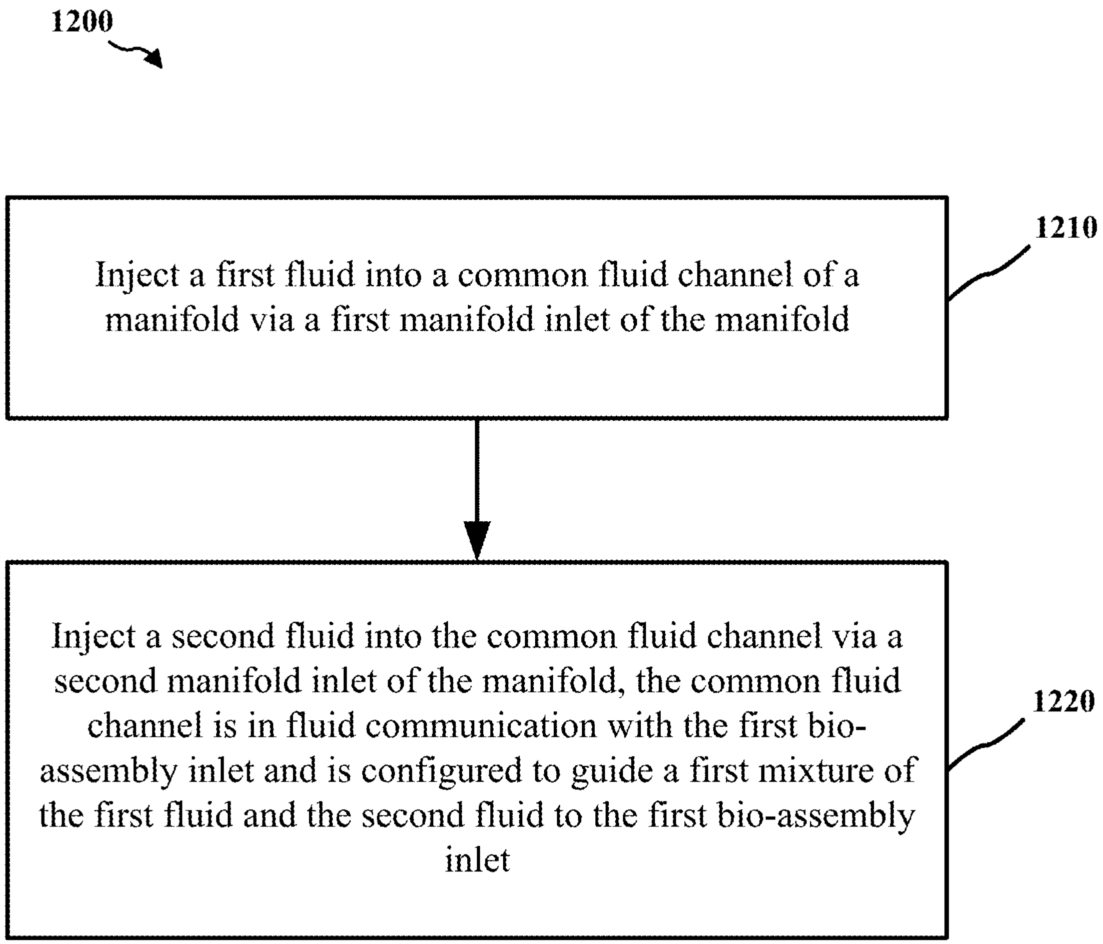
FIG. 12 is a flowchart for a method of mixing multiple fluids in a manifold, according to various embodiments.

FIG. 12 is a flowchart for a method of mixing multiple fluids in a manifold, according to various embodiments. Aspects of the method 1200 can be executed by microfluidic system 100 or other suitable means for performing the steps. As illustrated, the method 1200 includes a number of enumerated steps, but aspects of the method 1200 may include additional steps before, after, and in between the enumerated steps. In some embodiments, one or more of the enumerated steps may be omitted or performed in a different order.

At block 1210, a first fluid may be injected into a common fluid channel of a manifold via a first manifold inlet of the manifold. In some instances, the manifold includes a first partition having a first recess shaped and sized to receive a first bio-assembly having a first bio-assembly inlet, a first bio-assembly outlet and a first bio-scaffold disposed on (e.g., photocrosslinked to, covalently bound to, attached to, or placed adjacently without attachment to, etc.) a substrate.

At block 1220, a second fluid may be injected into the common fluid channel via a second manifold inlet of the manifold. In some instances, the common fluid channel is in fluid communication with the first bio-assembly inlet and is configured to guide a first mixture of the first fluid and the second fluid to the first bio-assembly inlet.

Figure 13:
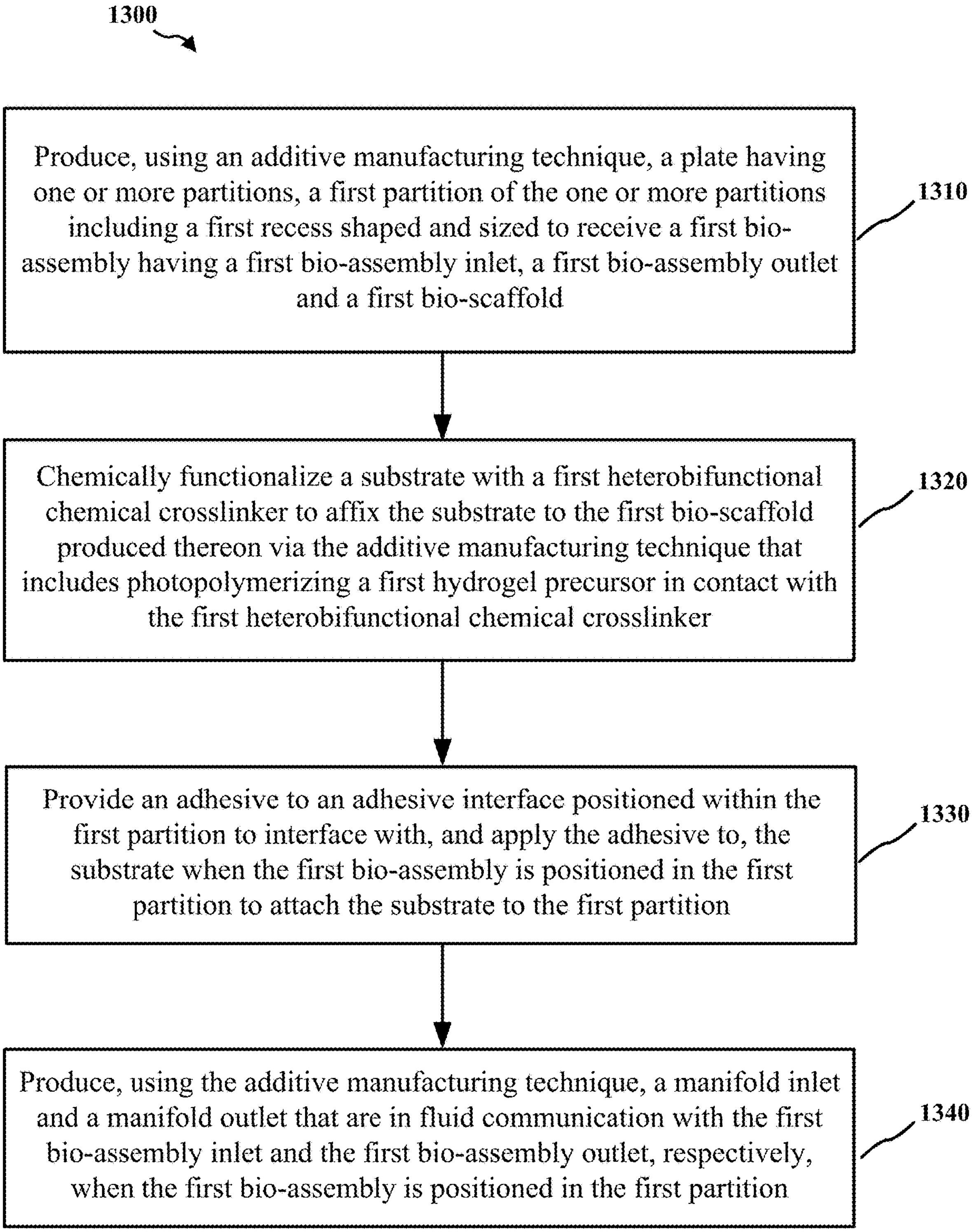
FIG. 13 is a flowchart for a method of generating a manifold, according to various embodiments.

FIG. 13 is a flowchart for a method of generating a manifold, according to various embodiments. Aspects of the method 1200 can be executed at least in part by a manufacturing device or machine such as a 3D printer that is uses additive manufacturing techniques. As illustrated, the method 1300 includes a number of enumerated steps, but aspects of the method 1300 may include additional steps before, after, and in between the enumerated steps. In some embodiments, one or more of the enumerated steps may be omitted or performed in a different order.

At block 1310, a plate having one or more partitions may be produced using an additive manufacturing technique. In some instances, a first partition of the one or more partitions can include a first recess shaped and sized to receive a first bio-assembly having a first bio-assembly inlet, a first bio-assembly outlet and a first bio-scaffold.

At block 1320, a substrate may be chemically functionalized with a first heterobifunctional chemical crosslinker. In some instances, the substrate is chemically functionalized to affix the substrate to the first bio-scaffold produced thereon. In some instances, the first bio-scaffold is produced on the substrate via the additive manufacturing technique that includes polymerizing (e.g., photopolymerizing) a first hydrogel precursor in contact with the first heterobifunctional chemical crosslinker.

At block 1330, an adhesive may be provided to an adhesive interface positioned within the first partition so that the adhesive interface interfaces with, and applies the adhesive to, the substrate when the first bio-assembly is positioned in the first partition. In some instances, the adhesive then may facilitate the attachment of the substrate to the first partition.

At block 1340, a manifold inlet and a manifold outlet may be produced using the additive manufacturing technique. In some instances, the manifold inlet and the manifold outlet may be in fluid communication with the first bio-assembly inlet and the first bio-assembly outlet, respectively, when the first bio-assembly is positioned in the first partition.

Recitation of Various Embodiments of the Present Disclosure

Embodiment 1: A manifold, comprising: a plate having one or more partitions, a first partition of the one or more partitions including: a first recess shaped and sized to receive a first bio-assembly having a first bio-assembly inlet, a first bio-assembly outlet and a first bio-scaffold that is disposed on a substrate; and an adhesive interface positioned within the first partition to interface with, and apply an adhesive to, the substrate of the first bio-assembly when the first bio-assembly is positioned in the first partition to attach the substrate of the first bio-assembly to the first partition; and a manifold inlet and a manifold outlet that are in fluid communication with the first bio-assembly inlet and the first bio-assembly outlet, respectively, when the first bio-assembly is positioned in the first partition.

Embodiment 2: The manifold of embodiment 1, wherein: a second partition of the one or more partitions includes a second recess shaped and sized to receive a second bio-assembly that has a second bio-assembly inlet, a second bio-assembly outlet, and a second bio-scaffold, wherein: one or both of: (i) the manifold inlet is in a first fluid communication with both the first bio-assembly inlet and the second bio-assembly inlet; and (ii) the manifold outlet is in a second fluid communication with both the first bio-assembly outlet and the second bio-assembly outlet.

Embodiment 3: The manifold of embodiment 2, wherein the first fluid communication and/or the second fluid communication are in series.

Embodiment 4: The manifold of embodiment 2, wherein the first fluid communication and/or the second fluid communication are in parallel.

Embodiment 5: The manifold of embodiment 2, wherein a third partition of the one or more partitions includes a third recess shaped and sized to receive a third bio-assembly that has a third bio-assembly inlet and a third bio-assembly outlet, wherein: the manifold inlet is in a third fluid communication with the first bio-assembly inlet, the second bio-assembly inlet, and the third bio-assembly inlet; the manifold outlet is in a fourth fluid communication with the first bio-assembly outlet, the second bio-assembly outlet, and the third bio-assembly outlet; and the third fluid communication and/or the fourth fluid communication are a combination of series and parallel fluid communications.

Embodiment 6: The manifold of any of embodiments 2-5, wherein a substrate of the second bio-assembly is same as the substrate of the first bio-assembly.

Embodiment 7: The manifold of any of embodiments 2-5, wherein a substrate of the second bio-assembly is different from the substrate of the first bio-assembly.

Embodiment 8: The manifold of any of the preceding embodiments, wherein the manifold inlet includes a first manifold inlet and a second manifold inlet each in fluid communication with the first bio-assembly inlet via a first fluid channel and a second fluid channel, respectively.

Embodiment 9: The manifold of embodiment 8, wherein the first fluid channel and the second fluid channel connect to a common fluid channel prior to reaching the first bio-assembly inlet.

Embodiment 10: The manifold of embodiment 9, wherein the common fluid channel includes a mixer positioned therein and configured to mix a first fluid flowing from the first fluid channel into the common fluid channel and a second fluid flowing from the second fluid channel into the common fluid channel.

Embodiment 11: The manifold of embodiment 10, wherein the mixer is a static mixer, a magnetic particle mixer, an acoustofluidic mixer, or an electrophoretic mixer.

Embodiment 12: The manifold of embodiment 11, wherein the static mixer includes antiparallel fins or helices.

Embodiment 13: The manifold of any of the preceding embodiments, wherein the adhesive is a liquid adhesive and the adhesive interface is an indentation configured to receive and apply the liquid adhesive to the substrate of the first bio-assembly when the first bio-assembly is positioned in the first partition.

Embodiment 14: The manifold of any of the preceding embodiments, wherein the adhesive interface includes a moat configured to prevent fluid leakage from the first partition.

Embodiment 15: The manifold of embodiment 14, wherein the moat contains ultra-violet or visible light curable resin, air, cyanoacrylate adhesive, silicone gasket, or any combination thereof.

Embodiment 16: The manifold of any of the preceding embodiments, further comprising a bubble outlet positioned upstream from the first bio-scaffold along a fluid channel of the manifold that is configured to carry a fluid therein.

Embodiment 17: The manifold of embodiment 16, wherein the bubble outlet includes a hydrophobic filter membrane configured to allow gas entrained in the fluid escape the fluid channel.

Embodiment 18: The manifold of any of the preceding embodiments, wherein the first partition further includes a bio-scaffold access channel coupled to a second bio-assembly outlet of the first bio-assembly and configured to transport fluids between an interior of the first bio-assembly and outside the first bio-assembly via the second bio-assembly outlet.

Embodiment 19: The manifold of any of the preceding embodiments, wherein the first bio-scaffold includes a fluid channel extending between the bio-scaffold inlet and the bio-scaffold outlet.

Embodiment 20: The manifold of embodiment 19, wherein the fluid channel includes a constriction configured to regulate flow of fluids therein.

Embodiment 21: The manifold of any of the preceding embodiments, wherein the first bio-scaffold includes a surface having a sectioning label covalently photocrosslinked thereon and configured to facilitate removal of the first bio-scaffold from the first bio-assembly after the first bio-assembly is positioned in the first partition and the substrate of the first bio-assembly is attached to the first partition.

Embodiment 22: The manifold of embodiment 21, wherein the sectioning label is a perforation, an indentation or a protrusion.

Embodiment 23: The manifold of any of the preceding embodiments, wherein the manifold inlet is in fluid communication with the first bio-assembly inlet via a first channel and the manifold outlet is in fluid communication with the first bio-assembly outlet via a second channel, one or both of the first channel and the second channel including a constriction configured to regulate flow of fluids therein.

Embodiment 24: The manifold of any of the preceding embodiments, wherein a number of the one or more partitions ranges from about 1 to about 1,536.

Embodiment 25: The manifold of any of the preceding embodiments, wherein a number of the one or more partitions ranges from about 12 to about 96.

Embodiment 26: The manifold of any of the preceding embodiments, wherein the manifold and/or the first bio-assembly are manufactured using an additive manufacturing technique.

Embodiment 27: The manifold of any of the preceding embodiments, wherein the first bio-scaffold is a hydrogel.

Embodiment 28: The manifold of any of the preceding embodiments, wherein the substrate is a glass substrate.

Embodiment 29: The manifold of any of the preceding embodiments, wherein the first bio-scaffold is crosslinked to the substrate via a heterobifunctional chemical crosslinker.

Embodiment 30: The manifold of embodiment 29, wherein the heterobifunctional chemical crosslinker includes a trichlorosilane configured to bond to the substrate and a methacrylate configured to bond to the first bio-scaffold.

Embodiment 31: A method, comprising: injecting a first fluid into a common fluid channel of a manifold via a first manifold inlet of the manifold; and injecting a second fluid into the common fluid channel via a second manifold inlet of the manifold, wherein the manifold includes a first partition having a first recess shaped and sized to receive a first bio-assembly having a first bio-assembly inlet, a first bio-assembly outlet and a first bio-scaffold disposed on a substrate; and the common fluid channel is in fluid communication with the first bio-assembly inlet and is configured to guide a first mixture of the first fluid and the second fluid to the first bio-assembly inlet.

Embodiment 32: The method of embodiment 31, wherein the first fluid includes a bioactive compound and the second fluid includes a cell culture media.

Embodiment 33: The method of embodiment 31 or 32, wherein: the manifold includes a second partition having a second recess shaped and sized to receive a second bio-assembly having a second bio-assembly inlet and a second bio-scaffold; and the common fluid channel is in fluid communication with the second bio-assembly inlet and is configured to guide a second mixture of the first fluid and the second fluid to the second bio-assembly inlet, the method further comprising: varying a property of the first fluid and/or the second fluid to adjust a difference between a first proportion of the first fluid in the first mixture to the second fluid in the first mixture and a second proportion of the first fluid in the second mixture to the second fluid in the second mixture.

Embodiment 34: The method of embodiment 33, wherein the property of the first fluid and/or the second fluid includes a flow rate of the injecting the first fluid and/or the injecting the second fluid.

Embodiment 35: The method of embodiment 33 or 34, wherein the property of the first fluid and/or the second fluid includes a viscosity of the first fluid and/or the second fluid.

Embodiment 36: The method of any of embodiments 33-35, wherein the property of the first fluid and/or the second fluid includes a concentration of species present within the first fluid and/or the second fluid.

Embodiment 37: The method of any of embodiments 33-36, further comprising mixing, via a mixer, the first fluid and the second fluid to form the first mixture.

Embodiment 38: The method of embodiment 37, wherein the mixer is a static mixer, a magnetic particle mixer, an acoustofluidic mixer, or an electrophoretic mixer.

Embodiment 39: The method of embodiment 38, wherein the static mixer includes antiparallel fins or helices.

Embodiment 40: The method of any of embodiments 33-39, wherein the second bio-assembly is affixed to the substrate.

Embodiment 41: The method of any of embodiments 33-40, wherein the substrate is a first substrate; and the second bio-assembly is affixed to a second substrate that is different from the first substrate.

Embodiment 42: The method of any of embodiments 31-41, wherein a relative concentration of the first fluid and the second fluid ranges from about 1:1 to about 1:10,000.

Embodiment 43: The method of any of embodiments 31-42, wherein a relative concentration of the first fluid and the second fluid ranges from about 1:1 to about 1:1,000.

Embodiment 44: The method of any of embodiments 31-43, wherein a relative concentration of the first fluid and the second fluid ranges from about 1:1 to about 1:100.

Embodiment 45: The method of any of embodiments 31-44, wherein the manifold includes an adhesive interface positioned within the first partition to interface with, and apply an adhesive to, the substrate of the first bio-assembly when the first bio-assembly is positioned in the first partition.

Embodiment 46: The method of embodiment 45, wherein the adhesive is a liquid adhesive and the adhesive interface is an indentation configured to receive and apply the liquid adhesive to the substrate of the first bio-assembly when the first bio-assembly is positioned in the first partition.

Embodiment 47: The method of embodiment 45 or 46, wherein the adhesive interface includes a moat configured to prevent fluid leakage from the first partition.

Embodiment 48: The method of embodiment 47, wherein the moat contains ultra-violet or visible light curable resin, air, cyanoacrylate adhesive, silicone gasket, or any combination thereof.

Embodiment 49: The method of any of embodiments 31-48, further comprising a bubble outlet positioned upstream from the first bio-scaffold along a fluid channel of the manifold that is configured to carry a fluid therein.

Embodiment 50: The method of embodiment 49, wherein the bubble outlet includes a hydrophobic filter membrane configured to allow gas entrained in the fluid escape the fluid channel.

Embodiment 51: The method of any of embodiments 31-50, wherein the first partition further includes a bio-scaffold access channel coupled to a bio-assembly outlet of the first bio-assembly and configured to transport fluids between an interior of the first bio-assembly and outside the first bio-assembly via the bio-assembly outlet.

Embodiment 52: The method of any of embodiments 31-51, wherein the first bio-scaffold includes a fluid channel extending between the bio-scaffold inlet and the bio-scaffold outlet.

Embodiment 53: The method of embodiment 52, wherein the fluid channel includes a constriction configured to regulate flow of fluids therein.

Embodiment 54: The method of any of embodiments 31-53, wherein the first bio-scaffold includes a surface having a sectioning label covalently photocrosslinked thereon and configured to facilitate removal of the first bio-scaffold from the first bio-assembly after the first bio-assembly is positioned in the first partition and the substrate of the first bio-assembly is attached to the first partition.

Embodiment 55: The method of embodiment 54, wherein the sectioning label is a perforation, an indentation or a protrusion.

Embodiment 56: The method of any of embodiments 31-55, wherein the manifold and/or the first bio-assembly are manufactured using an additive manufacturing technique.

Embodiment 57: The method of any of embodiments 31-56, wherein the first bio-scaffold is a hydrogel.

Embodiment 58: The method of any of embodiments 31-57, wherein the substrate is a transparent substrate.

Embodiment 59: The method of any of embodiments 31-58, wherein the first bio-scaffold is photocrosslinked to the substrate via a heterobifunctional chemical crosslinker.

Embodiment 60: The method of embodiment 59, wherein the heterobifunctional chemical crosslinker includes a trichlorosilane configured to bond to the substrate and a methacrylate configured to bond to the first bio-scaffold.

Embodiment 61: A method for generating a manifold, the method comprising: producing, using an additive manufacturing technique, a plate having one or more partitions, a first partition of the one or more partitions including a first recess shaped and sized to receive a first bio-assembly having a first bio-assembly inlet, a first bio-assembly outlet and a first bio-scaffold; chemically functionalizing a substrate with a first heterobifunctional chemical crosslinker to affix the substrate to the first bio-scaffold produced thereon via the additive manufacturing technique that includes polymerizing a first hydrogel precursor in contact with the first heterobifunctional chemical crosslinker; providing an adhesive to an adhesive interface positioned within the first partition to interface with, and apply the adhesive to, the substrate when the first bio-assembly is positioned in the first partition to attach the substrate to the first partition; and producing, using the additive manufacturing technique, a manifold inlet and a manifold outlet that are in fluid communication with the first bio-assembly inlet and the first bio-assembly outlet, respectively, when the first bio-assembly is positioned in the first partition.

Embodiment 62: The method of embodiment 61, wherein: the first heterobifunctional chemical crosslinker includes a trichlorosilane and a methacrylate; and the chemically functionalizing the substrate includes causing a bonding of the trichlorosilane to the substrate and a bonding of the methacrylate to the first bio-scaffold.

Embodiment 63: The method of embodiment 61 or 62, wherein: a second partition of the one or more partitions includes a second recess shaped and sized to receive a second bio-assembly that has a second bio-assembly inlet, a second bio-assembly outlet, and a second bio-scaffold, wherein: one or both of: (i) the manifold inlet is in a first fluid communication with both the first bio-assembly inlet and the second bio-assembly inlet; and (ii) the manifold outlet is in a second fluid communication with both the first bio-assembly outlet and the second bio-assembly outlet.

Embodiment 64: The method of embodiment 63, wherein the first fluid communication and/or the second fluid communication are in series.

Embodiment 65: The method of embodiment 63, wherein the first fluid communication and/or the second fluid communication are in parallel.

Embodiment 66: The method of embodiment 63, wherein: a third partition of the one or more partitions includes a third recess shaped and sized to receive a third bio-assembly that has a third bio-assembly inlet and a third bio-assembly outlet, wherein: the manifold inlet is in a third fluid communication with the first bio-assembly inlet, the second bio-assembly inlet, and the third bio-assembly inlet; the manifold outlet is in a fourth fluid communication with the first bio-assembly outlet, the second bio-assembly outlet, and the third bio-assembly outlet; and the third fluid communication and/or the fourth fluid communication are a combination of series and parallel fluid communications.

Embodiment 67: The method of any of embodiments 63-66, wherein a substrate of the second bio-assembly is same as the substrate of the first bio-assembly.

Embodiment 68: The method of any of embodiments 63-66, wherein a substrate of the second bio-assembly is different from the substrate of the first bio-assembly.

Embodiment 69: The method of any of embodiments 61-68, wherein the manifold inlet includes a first manifold inlet and a second manifold inlet each in fluid communication with the first bio-assembly inlet via a first fluid channel and a second fluid channel, respectively.

Embodiment 70: The method of embodiment 69, wherein the first fluid channel and the second fluid channel connect to a common fluid channel prior to reaching the first bio-assembly inlet.

Embodiment 71: The method of embodiment 70, wherein the common fluid channel includes a mixer positioned therein and configured to mix a first fluid flowing from the first fluid channel into the common fluid channel and a second fluid flowing from the second fluid channel into the common fluid channel.

Embodiment 72: The method of embodiment 71, wherein the mixer is a static mixer, a magnetic particle mixer, an acoustofluidic mixer, or an electrophoretic mixer.

Embodiment 73: The method of embodiment 72, wherein the static mixer includes antiparallel fins or helices.

Embodiment 74: The method of any of embodiments 61-73, wherein the adhesive is a liquid adhesive and the adhesive interface is an indentation configured to receive and apply the liquid adhesive to the substrate of the first bio-assembly when the first bio-assembly is positioned in the first partition.

Embodiment 75: The method of any of embodiments 61-74, wherein the adhesive interface includes a moat configured to prevent fluid leakage from the first partition.

Embodiment 76: The method of embodiment 75, wherein the moat contains ultra-violet or visible light curable resin, air, cyanoacrylate adhesive, silicone gasket, or any combination thereof.

Embodiment 77: The method of any of embodiments 61-76, wherein further comprising a bubble outlet positioned upstream from the first bio-scaffold along a fluid channel of the manifold that is configured to carry a fluid therein.

Embodiment 78: The method of embodiment 77, wherein the bubble outlet includes a hydrophobic filter membrane configured to allow gas entrained in the fluid escape the fluid channel.

Embodiment 79: The method of any of embodiments 61-78, wherein the first partition further includes a bio-scaffold access channel coupled to a second bio-assembly outlet of the first bio-assembly and configured to transport fluids between an interior of the first bio-assembly and outside the first bio-assembly via the second bio-assembly outlet.

Embodiment 80: The method of any of embodiments 61-79, wherein the first bio-scaffold includes a fluid channel extending between the bio-scaffold inlet and the bio-scaffold outlet.

Embodiment 81: The method of embodiment 80, wherein the fluid channel includes a constriction configured to regulate flow of fluids therein.

Embodiment 82: The method of any of embodiments 61-81, further comprising: removing the first bio-scaffold from the first bio-assembly by separating the first bio-scaffold from the substrate at a sectioning label covalently photocrosslinked on a surface of the substrate and configured to facilitate removal of the first bio-scaffold from the first bio-assembly after the first bio-assembly is positioned in the first partition and the substrate of the first bio-assembly is attached to the first partition.

Embodiment 83: The method of embodiment 82, wherein the sectioning label is a perforation, an indentation or a protrusion.

Embodiment 84: The method of any of embodiments 61-83, wherein the manifold inlet is in fluid communication with the first bio-assembly inlet via a first channel and the manifold outlet is in fluid communication with the first bio-assembly outlet via a second channel, one or both of the first channel and the second channel including a constriction configured to regulate flow of fluids therein.

Embodiment 85: The method of any of embodiments 61-84, wherein a number of the one or more partitions ranges from about 1 to about 1,536.

Embodiment 86: The method of any of embodiments 61-85, wherein a number of the one or more partitions ranges from about 12 to about 96.

Embodiment 87: The method of any of embodiments 61-86, wherein the substrate is a transparent glass substrate.

Embodiment 88: A bio-assembly, comprising: a lid; a barrier configured to adhere to the lid when in contact with the lid; a housing including a bio-assembly inlet and a bio-assembly outlet; a gasket configured to be positioned in between the barrier and the housing and provide at least substantially airtight seal when the barrier or the lid is affixed to the housing; a substrate configured to adhere to the housing when in contact with the housing; and a bio-scaffold produced using an additive manufacturing technique on a polymerized hydrogel precursor positioned on the substrate, the bio-scaffold affixed to the substrate via a chemical functionalization of the substrate with a heterobifunctional chemical crosslinker in contact with the hydrogel precursor.

Embodiment 89: The bio-assembly of embodiment 88, further comprising a bubble outlet positioned upstream from the bio-scaffold along a fluid channel that is configured to carry a fluid therein.

Embodiment 90: The bio-assembly of embodiment 89, wherein the bubble outlet includes a hydrophobic filter membrane configured to allow gas entrained in the fluid escape the fluid channel.

Embodiment 91: The bio-assembly of any of embodiments 88-90, wherein the bio-assembly outlet is a first bio-assembly outlet, the bio-assembly further comprising: a second bio-assembly outlet; and a bio-scaffold access channel coupled to the second bio-assembly outlet and configured to transport fluids between an interior of the housing and outside the bio-assembly via the second bio-assembly outlet.

Embodiment 92: The bio-assembly of any of embodiments 88-91, wherein the bio-scaffold includes a fluid channel extending between the bio-scaffold inlet and the bio-scaffold outlet.

Embodiment 93: The bio-assembly of embodiment 92, wherein the fluid channel includes a constriction configured to regulate flow of fluids therein.

Embodiment 94: The bio-assembly of any of embodiments 88-93, wherein the bio-scaffold includes a surface having a sectioning label covalently photocrosslinked thereon and configured to facilitate removal of the bio-scaffold from the bio-assembly.

Embodiment 95: The bio-assembly of embodiment 94, wherein the sectioning label is a perforation, an indentation or a protrusion.

Embodiment 96: The bio-assembly of any of embodiments 88-95, wherein the housing is manufactured using an additive manufacturing technique.

Embodiment 97: The bio-assembly of any of embodiments 88-96, wherein the heterobifunctional chemical cross-linker includes a trichlorosilane configured to bond to the substrate and a methacrylate configured to bond to the bio-scaffold.

Embodiment 98: The bio-assembly of any of embodiments 88-97, wherein the bio-scaffold is affixed to the substrate covalently.

Embodiment 99: The bio-assembly of any of embodiments 88-98, wherein the substrate is a transparent glass substrate.

Embodiment 100: The bio-assembly of any of embodiments 88-99, wherein the substrate is configured to adhere to the housing when in contact with the housing with an adhesive or covalently.

Embodiment 101: A system, comprising: a manifold including: a plate having one or more partitions, a partition of the one or more partitions including a recess shaped and sized to receive the bio-assembly; and a manifold inlet and a manifold outlet; a bio-assembly positioned in the partition and having a bio-assembly inlet, a bio-assembly outlet and a bio-scaffold that is disposed on a substrate, the bio-assembly inlet and the bio-assembly outlet in fluid communication with the manifold inlet and the manifold outlet; an inlet reservoir in fluid communication with the manifold inlet and configured to store a fluid to be fed into the manifold via the manifold inlet; a fluid pump configured to pump the fluid from the inlet reservoir into the manifold via the manifold inlet; and an outlet reservoir in fluid communication with the manifold outlet and configured to receive and store fluid released by the manifold via the manifold outlet.

Embodiment 102: The manifold of embodiment 17, wherein the filter membrane is configured to be secured to a top cover of the bubble outlet via an adhesive including a tape and a liquid adhesive/glue.

Embodiment 103: The method of embodiment 50, wherein the filter membrane is configured to be secured to a top cover of the bubble outlet via an adhesive including a tape and a liquid adhesive/glue.

Embodiment 104: The manifold of embodiment 77, wherein the filter membrane is configured to be secured to a top cover of the bubble outlet via an adhesive including a tape and a liquid adhesive/glue.

Embodiment 105: The bio-assembly of embodiment 90, wherein the filter membrane is configured to be secured to a top cover of the bubble outlet via an adhesive including a tape and a liquid adhesive/glue.

Embodiment 106: The manifold of any of embodiments 1-30, wherein the manifold inlet includes three or more manifold inlets each in communication with a common fluid channel configured to mix fluids flowing into the three or more manifold inlets.

Embodiment 107: The manifold of embodiment 1, wherein the substrate is a plastic substrate.

Embodiment 108: The manifold of embodiment 1, wherein the substrate is made from a first material including polycarbonate, polysulfone, polymethyl methacrylate, polystyrene, cyclic olefin copolymer, polyethylene, polypropylene, glass, quartz, mica, a infrared-transparent salt, or combination thereof.

Embodiment 109: The manifold of embodiment 108, wherein the substrate is made from a combination of the first material and a second material including a thin film.

Embodiment 110: The manifold of embodiment 109, wherein the thin film is a metallic film configured to allow a surface plasmon based measurement.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

A reference to an element in the singular is not intended to mean "one and only one" unless specifically stated, but rather "one or more." As used herein, the term "about" used with respect to numerical values or parameters or characteristics that can be expressed as numerical values means within ten percent of the numerical values. For example, "about 50" means a value in the range from 45 to 55, inclusive.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A manifold, comprising:

a plate having one or more partitions, a first partition of the one or more partitions including:

a first recess shaped and sized to receive a first bio-assembly having a first bio-assembly inlet, a first bio-assembly outlet and a first bio-scaffold that is disposed on a substrate, a bio-scaffold inlet of the first bio-scaffold being in fluid communication with the first bio-assembly inlet and a bio-scaffold outlet of the first bio-scaffold being in fluid communication with the first bio-assembly outlet; and an adhesive interface positioned within the first partition to interface with, and apply an adhesive to, the substrate of the first bio-assembly when the first bio-assembly is positioned in the first partition to attach the substrate of the first bio-assembly to the first partition; and a manifold inlet and a manifold outlet that are in fluid communication with the first bio-assembly inlet and the first bio-assembly outlet, respectively, when the first bio-assembly is positioned in the first partition;

wherein the first partition further includes a bio-scaffold access channel coupled to a second bio-assembly outlet of the first bio-assembly and configured to transport fluids between an interior of the first bio-assembly and outside the first bio-assembly via the second bio-assembly outlet.

2. The manifold of claim 1, wherein the plate having one or more partitions comprises:

a second partition including a second recess shaped and sized to receive a second bio-assembly that has a second bio-assembly inlet, a second bio-assembly outlet and a second bio-scaffold, wherein:

one or both of:

the manifold inlet is in a first fluid communication with both the first bio-assembly inlet and the second bio-assembly inlet; and the manifold outlet is in a second fluid communication with both the first bio-assembly outlet and the second bio-assembly outlet.

3. The manifold of claim 2, wherein the first fluid communication and/or the second fluid communication are in series.

4. The manifold of claim 2, wherein the first fluid communication and/or the second fluid communication are in parallel.

5. The manifold of claim 2, wherein the plate having one or more partitions comprises:

a third partition including a third recess shaped and sized to receive a third bio-assembly that has a third bio-assembly inlet, a third bio-assembly outlet, and a third bio-scaffold, wherein:

the manifold inlet is in a third fluid communication with the first bio-assembly inlet, the second bio-assembly inlet, and the third bio-assembly inlet;

the manifold outlet is in a fourth fluid communication with the first bio-assembly outlet, the second bio-assembly outlet, and the third bio-assembly outlet; and the third fluid communication and/or the fourth fluid communication are a combination of series and parallel fluid communications.

6. The manifold of claim 2, wherein a substrate of the second bio-assembly is same as the substrate of the first bio-assembly.

7. The manifold of claim 2, wherein a substrate of the second bio-assembly is different from the substrate of the first bio-assembly.

8. The manifold of claim 1, wherein the manifold inlet includes a first manifold inlet and a second manifold inlet each in fluid communication with the first bio-assembly inlet via a first fluid channel and a second fluid channel, respectively.

9. The manifold of claim 8, wherein the first fluid channel and the second fluid channel connect to a common fluid channel prior to reaching the first bio-assembly inlet.

10. The manifold of claim 9, wherein the common fluid channel includes a mixer positioned therein and configured to mix a first fluid flowing from the first fluid channel into the common fluid channel and a second fluid flowing from the second fluid channel into the common fluid channel.

11. The manifold of claim 10, wherein the mixer is a static mixer, a magnetic particle mixer, an acoustofluidic mixer, or an electrophoretic mixer.

12. The manifold of claim 11, wherein the static mixer includes antiparallel fins or helices.

13. The manifold of claim 1, wherein the adhesive is a liquid adhesive and the adhesive interface is an indentation configured to receive and apply the liquid adhesive to the substrate of the first bio-assembly when the first bio-assembly is positioned in the first partition.

14. A manifold, comprising:

a plate having one or more partitions, a first partition of the one or more partitions including:

a first recess shaped and sized to receive a first bio-assembly having a first bio-assembly inlet, a first bio-assembly outlet and a first bio-scaffold that is disposed on a substrate, a bio-scaffold inlet of the first bio-scaffold being in fluid communication with the first bio-assembly inlet and a bio-scaffold outlet of the first bio-scaffold being in fluid communication with the first bio-assembly outlet; and an adhesive interface positioned within the first partition to interface with, and apply an adhesive to, the substrate of the first bio-assembly when the first bio-assembly is positioned in the first partition to attach the substrate of the first bio-assembly to the first partition; and a manifold inlet and a manifold outlet that are in fluid communication with the first bio-assembly inlet and the first bio-assembly outlet, respectively, when the first bio-assembly is positioned in the first partition;

wherein the adhesive interface includes a moat configured to prevent fluid leakage from the first partition;

wherein the moat contains ultra-violet or visible light curable resin, air, cyanoacrylate adhesive, silicone gasket, or any combination thereof.

15. The manifold of claim 1, further comprising a bubble outlet positioned upstream from the first bio-scaffold along a fluid channel of the manifold that is configured to carry a fluid therein.

16. The manifold of claim 15, wherein the bubble outlet includes a hydrophobic filter membrane configured to allow gas entrained in the fluid escape the fluid channel.

17. The manifold of claim 1, wherein the first bio-scaffold includes a fluid channel extending between the bio-scaffold inlet and the bio-scaffold outlet.

18. The manifold of claim 17, wherein the fluid channel includes a constriction configured to regulate flow of fluids therein.

19. A manifold, comprising:

a plate having one or more partitions, a first partition of the one or more partitions including:

a first recess shaped and sized to receive a first bio-assembly having a first bio-assembly inlet, a first bio-assembly outlet and a first bio-scaffold that is disposed on a substrate, a bio-scaffold inlet of the first bio-scaffold being in fluid communication with the first bio-assembly inlet and a bio-scaffold outlet of the first bio-scaffold being in fluid communication with the first bio-assembly outlet; and an adhesive interface positioned within the first partition to interface with, and apply an adhesive to, the substrate of the first bio-assembly when the first bio-assembly is positioned in the first partition to attach the substrate of the first bio-assembly to the first partition; and a manifold inlet and a manifold outlet that are in fluid communication with the first bio-assembly inlet and the first bio-assembly outlet, respectively, when the first bio-assembly is positioned in the first partition;

wherein the first bio-scaffold includes a surface having a sectioning label covalently photocrosslinked thereon and configured to facilitate removal of the first bio-scaffold from the first bio-assembly after the first bio-assembly is positioned in the first partition and the substrate of the first bio-assembly is attached to the first partition.

20. The manifold of claim 19, wherein the sectioning label is a perforation, an indentation or a protrusion.

21. The manifold of claim 1, wherein the manifold inlet is in fluid communication with the first bio-assembly inlet via a first channel and the manifold outlet is in fluid communication with the first bio-assembly outlet via a second channel, one or both of the first channel and the second channel including a constriction configured to regulate flow of fluids therein.

22. The manifold of claim 1, wherein a number of the one or more partitions ranges from about 1 to about 1,536.

23. The manifold of claim 1, wherein a number of the one or more partitions ranges from about 4 to about 96.

24. The manifold of claim 1, wherein the manifold and/or the first bio-assembly are manufactured using an additive manufacturing technique.

25. The manifold of claim 1, wherein the first bio-scaffold is a hydrogel.

26. The manifold of claim 1, wherein the substrate is a glass substrate.

27. The manifold of claim 1, wherein the first bio-scaffold is photocrosslinked to the substrate via a heterobifunctional chemical crosslinker.

28. The manifold of claim 27, wherein the heterobifunctional chemical crosslinker includes a trichlorosilane configured to bond to the substrate and a methacrylate configured to bond to the first bio-scaffold.

* * * * *